(12) United States Patent
Rumala

(10) Patent No.: US 11,448,732 B2
(45) Date of Patent: *Sep. 20, 2022

(54) FREQUENCY MODULATED SCANNING LIDAR WITH 360 DEGREES FIELD OF VIEW

(71) Applicant: NORTHROP GRUMMAN SYSTEMS CORPORATION, Falls Church, VA (US)

(72) Inventor: Yisa S. Rumala, New York, NY (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 792 days.

This patent is subject to a terminal disclaimer.

(21) Appl. No.: 16/418,654

(22) Filed: May 21, 2019

(65) Prior Publication Data
US 2020/0371212 A1    Nov. 26, 2020

(51) Int. Cl.
*G01S 7/481* (2006.01)
*G01S 17/42* (2006.01)
(Continued)

(52) U.S. Cl.
CPC ............ *G01S 7/4814* (2013.01); *G01S 7/484* (2013.01); *G01S 7/4863* (2013.01); *G01S 17/42* (2013.01); *G01S 17/58* (2013.01)

(58) Field of Classification Search
CPC ...... G10S 7/4814; G01S 17/42; G01S 7/4863; G01S 7/484; G01S 17/58; G01S 7/4813;
(Continued)

(56) References Cited

U.S. PATENT DOCUMENTS 3,975,102 A    8/1976  Rosenfeld et al.
3,977,789 A    8/1976  Hunter et al.
(Continued)

FOREIGN PATENT DOCUMENTS

WO    2012037909 A2    3/2012
WO    2018067158 A1    4/2018
WO    2018102188 A1    7/2018

OTHER PUBLICATIONS

Yisa S. Rumala: "Optical vortex rotation and propagation from a spiral phase plate resonator with surface reflective coating", Optics Letters, vol. 45, No. 6, Mar. 13, 2020 (Mar. 13, 2020), p. 1555, XP055718539, US ISSN:0416-9592, DOI: 10,1364/OL.387081 the whole document.
(Continued)

*Primary Examiner* — Daniel L Murphy
(74) *Attorney, Agent, or Firm* — John A. Miller; Shumaker, Loop & Kendrick, LLP

(57) ABSTRACT

A method for scanning a transmitted beam through a 360° FOV in a LIDAR system using no moving parts. The method includes generating a laser beam, frequency modulating the laser beam, and directing the frequency modulated laser beam to a spiral phase plate resonator (SPPR) device. The method further includes directing the beam from the SPPR device onto a conical mirror, and receiving a reflected beam from the target. The method mixes and correlates the transmitted beam and the reflected beam, calculates a fast Fourier transform of signals representing the mixed transmitted and reflected beams, determines beat frequencies in the mixed and transformed signals, identifies intermediate frequencies in the beat frequencies, estimates a time delay between the transmitted beam and the reflected beam from the beat frequencies to determine the distance to the target, and
(Continued)

determines a Doppler frequency from the beat frequencies to determine the velocity of the target.

24 Claims, 15 Drawing Sheets

(51) Int. Cl.
    *G01S 17/58*           (2006.01)
    *G01S 7/484*           (2006.01)
    *G01S 7/486*           (2020.01)
    *G01S 7/4863*         (2020.01)

(58) Field of Classification Search
    CPC .......... G01S 17/26; G01S 17/86; G01S 7/499; G01S 7/4817
    USPC ........................................................ 356/5.01
    See application file for complete search history.

(56) References Cited

U.S. PATENT DOCUMENTS

| | | | |
|---|---|---|---|
| 4,746,216 | A | 5/1988 | Sommargren |
| 5,028,137 | A | 7/1991 | Sommargren et al. |
| 6,188,078 | B1 | 2/2001 | Bell, Jr. et al. |
| 8,099,876 | B1 | 1/2012 | Truncale et al. |
| 8,903,978 | B2 | 12/2014 | Zerr et al. |
| 9,107,055 | B2 | 8/2015 | Zerr et al. |
| 9,369,829 | B2 | 6/2016 | Zerr et al. |
| 9,753,241 | B2 | 9/2017 | Benischek et al. |
| 9,810,775 | B1 | 11/2017 | Welford et al. |
| 9,854,388 | B2 | 12/2017 | Zerr et al. |
| 9,863,844 | B2 | 1/2018 | Oya et al. |
| 10,323,934 | B1 | 6/2019 | Rumala |
| 10,788,664 | B2 * | 9/2020 | Rumala ................ G01S 7/4814 |
| 2003/0020903 | A1 | 1/2003 | Healy et al. |
| 2006/0191148 | A1 | 8/2006 | Lippuner |
| 2010/0302528 | A1 | 12/2010 | Hall |
| 2011/0216304 | A1 | 9/2011 | Hall |
| 2012/0188467 | A1 | 7/2012 | Escuti et al. |
| 2014/0159925 | A1 | 6/2014 | Mimeault et al. |
| 2015/0345950 | A1 | 12/2015 | Sagemueller et al. |
| 2016/0099928 | A1 | 4/2016 | Chatwin et al. |
| 2016/0202283 | A1 | 7/2016 | Wang et al. |
| 2016/0299228 | A1 | 10/2016 | Maleki et al. |
| 2016/0377706 | A1 | 12/2016 | Keller et al. |
| 2017/0131387 | A1 | 5/2017 | Campell et al. |
| 2017/0146640 | A1 | 5/2017 | Hall et al. |
| 2017/0155225 | A1 | 6/2017 | Villeneuve et al. |
| 2017/0219426 | A1 | 8/2017 | Pacala et al. |
| 2017/0289524 | A1 | 10/2017 | Pascala et al. |
| 2017/0363448 | A1 | 12/2017 | Dunn et al. |
| 2018/0224547 | A1 | 9/2018 | Crouch et al. |
| 2019/0146061 | A1 | 5/2019 | Carothers |
| 2019/0293929 | A1 | 9/2019 | Rumala et al. |
| 2020/0371213 | A1 * | 11/2020 | Rumala ................ G01S 7/4814 |
| 2020/0371239 | A1 * | 11/2020 | Rumala ................ G01S 17/89 |

OTHER PUBLICATIONS

PCT International Search Report of the International Searching Authority dated Aug. 18, 2020 for International Application No. PCT/US2020/033034 filed May 15, 2020.
Fickler, Robert, Lapkiewicz, Radek, Plick, William N., Krenn, Mario, Schaeff, Christoph, Ramelow, Sven, Zeilinger, Anton; "Quantum Entanglement of High Angular Momenta"; Nov. 2, 2012; vol. 338; www.sciencemag.org; pp. 640-643.
Rumala, Yisa S.; "Wave transfer matrix for a spiral phase plate"; vol. 54, No. 25; May 10, 2015; Applied Optics; 1559-128X/15/144395-08.
Rumala, Yisa S.; "Sensitivity in frequency dependent angular rotation of optical vortices"; vol. 55, No. 8; May 10, 2016; Applied Optics; 1559-128X/16/082024-10.
Forbes, Andrew, Dudley, Angela, McLaren, Melanie; "Creation and detection of optical modes with spatial light modulators"; vol. 8, No. 2; Jun. 2016; Advances in Optics and Photonics.
Rumala, Yisa S., Leanhardt, Aaron E.; "Multiple-beam interference in a spiral phase plate"; vol. 30, No. 3; Mar. 2013; J. Opt. Soc. Am. B; 0740-3224/13030615-07.
Rumala, Yisa S.; "Interference theory of multiple optical vortex states in spiral phase plate etalon: thick-plate and thin-plate approximation"; vol. 31, No. 6; Jun. 2014; Journal of the Optical Society of America B; D740-3224/13/030615-07.
Rumala, Yisa S., Leanhardt, Aaron E.; "Optical vortex with a small core and Gaussian intensity envelope for light-matter interaction"; vol. 34, No. 5; May 2017; Journal of the Optical Society of America B; 0740-3224/17/050909-10.
D'Ambrosio, Vincenzo; Spagnolo, Nicolo, Del Re, Lorenzo, Slussarenko, Sergei, Li, Ying, Kwek, Leong Chuan, Marrucci, Lorenzo, Walborn, Stephen P., Aolita, Leandro, Sciarrino, Fabio; Photonic polarization gears for ultra-sensitive angula measurements; Nature Communications; 4:2432; DOI: 10.1038/ncomms3432; www.nature.com/naturecommunications; Published Sep. 18, 2013.
Rumala, Yisa S.; "Propagation of structured light beams after multiple reflections in a spiral phase plate"; Optical Engineering; http://opticalengineering.spiedigitallibrary.org/; Nov. 2015; vol. 54.
Yin, Yanhe; Cai, Sheng; Qiao, Yanfeng; "Design, fabrication, and verification of a three-dimensional autocollimator" Optical Society of America; vol. 55, No. 35, Dec. 10, 2016, Applied Optics, pp. 9986-9991.
Ju, Aisong; Hou, Wenmei; Le, Yanfen; "Enhanced roll-angle measurement interferometer"; Optical Engineering, vol. 54, No. 3, p. 034101, 2015. 25, 2016.
Lavery, Martin P.J.; Barnett, Stephen M.; Speirits, Fiona C.; Padgett, Miles J.; "Observation of the rotational Doppler shift of a white-light, orbital-angular-momentum-carrying beam backscattered from a rotating body" corresponding author: martin.lavery@glasgow.ac.uk; 2014 Optical Society of America; vol. 1 No. 1 / Jul. 2014 / Optica; 2334-2536/14/010001-04$15/0$15.00; Doc ID 210521; published Jul. 22, 2014.
Fickler, Robert; Campbell, Geoff; Buchler, Ben; Lam, Ping Koy; Zellinger, Anton; "Quantum entanglement of angular momentum status with quantum numbers up to 10.010"; Nov. 29, 2016; 13642-13647; vol. 113 No. 48; PNAS; www.pnas.org/cgi/doi/10.1073/pnas.1616889113.
Rumala, Yisa S.; Milione, Giovanni; Nguyen, Thien An; Pratavieira, Sebastiao; Hossain, Zabir; Nolan, Daniel; Slussarenko, Sergei; Karimi, Ebrahim; Marrucci, Lorenzo; and Alfano, Robert R.; "Tunable supercontinuum light vector vertex beam generator using a q-plate"; Optics Letters, vol. 38, No. 23, pp. 5083-5086, 2013.
O'Toole, M. et al. "Confocal non-line-of-sight imaging based on the light-cone transform." Nature. vol. 555, Mar. 2018, pp. 338-341.
Nakamura, T. et al. "Optical frequency domain ranging by a frequency-shifted feedback laser," IEEE Journal of Quantum Electronics. vol. 36, No. 3, pp. 305-316, 2000.
Bhandari, A. et al. "Resolving multipath interference in time-of-flight imaging via modulation frequency diversity and sparse regularization." Optic Letters, Mar. 15, 2014, vol. 39, No. 6, pp. 1705-1708.
Zhou, Hailong; Fu, Dongzhi; Dong, Jianji; Zhang, Pei; Zhang, Xinliang; "Theoretical analysis and experimental Verification on optical rotational Doppler effect"; Optical Society of America; vol. 24, No. 9 DOI:10.1364/OE.24.010050 Optics Express 10050; published Apr. 28, 2016.
Zhao, Mingyang; Gao, Xinlu; Xie, Mutong; Zhai, Wensheng; Xu, Wenjing; Huang, Shanguo, Gu, Wanyi; "Measurement of the rotational Doppler frequency shift of a spinning object using a radio frequency orbital angular momentum beam"; 2016 Optical Society of America; vol. 41, No. 11 / Jun. 1, 2016 / Optics Letters p. 2549; Doc. ID 261469; corresponding author: shghuang@bupt.edu.cn; published May 25, 2016.
Amann, M.C. et al. "Laser ranging: a critical review of usual techniques for distance measurements." Optical Engineering. vol 40, No. 1, pp. 10-19, 2001.

(56) References Cited

OTHER PUBLICATIONS

Adany, P. et al. "Chirped lidar using simplified hmodyne detection." Journal of Lightwave Technology. vol. 27, No. 16, pp. 3351-3357, 2009.
Poulton, C.V. et al. "Coherent solid-state lidar with silicon photonic optical phased array." Optics Letters. vol. 42, No. 20, pp. 4091-4094, 2017.
Stann, B.L. et al. "Intensity-modulated diode laser radar using frequency-modulated/continuous-wave ranging techniques." Optics Express. vol. 26, No. 12, pp. 15420-15434, 2018.
Pierrottet, D.F. "Linear FMCW laser radar for precision range and vector velocity measurements." MRS PROC. vol. 1076, pp. 1076-k04-06, 2008.
Lum, D.J. "Frequency-modulated continuous-wave LIDAR compressive depth-mapping." Optics Express. vol. 26, No. 12, pp. 15420-15434, 2018.
Gao, S. and Hui, R. "Frequency-modulated continuous-wave lidar using I/Q modular for simplified heterodyne detection." Optics Letters. vol. 37, No. 11, pp. 2022-2024, 2012.

\* cited by examiner

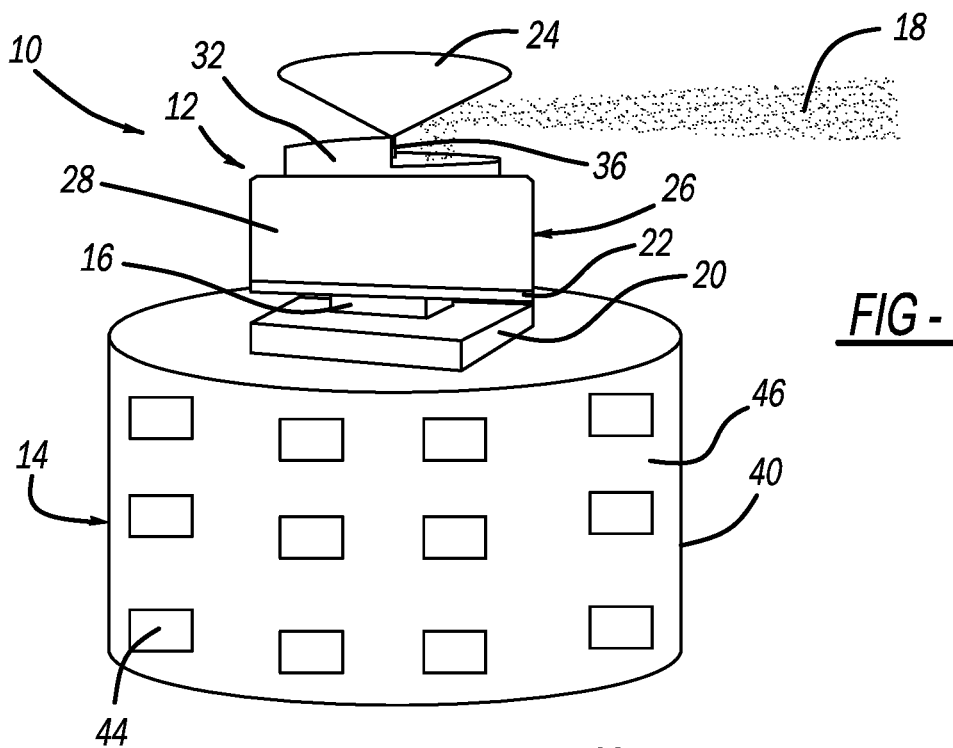
*FIG - 1*
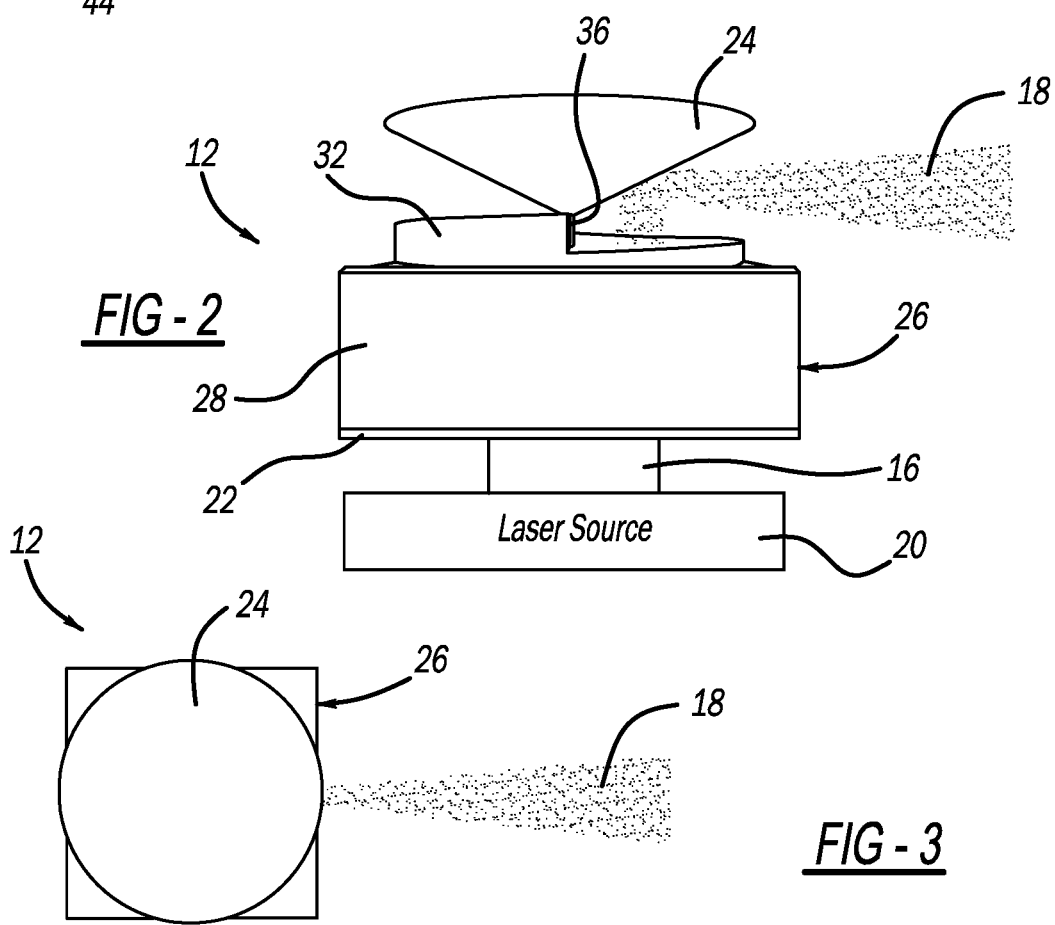
*FIG - 2*
*FIG - 3*

FREQUENCY MODULATED SCANNING LIDAR WITH 360 DEGREES FIELD OF VIEW

BACKGROUND

Field

The present disclosure relates generally to a method for scanning a laser beam from a LIDAR system through a 360° field-of-view (FOV) and processing beams reflected off of targets for range finding purposes and, more particularly, to a method for scanning a frequency modulated laser beam from a LIDAR system through a 360° FOV using a spiral phase plate resonator (SPPR) device and processing beams reflected off of targets for range finding purposes.

Discussion

Light detection and ranging (LIDAR) is a process that transmits modulated pulsed optical beams that are reflected off of a target and the return beam is detected, where the time of flight of the beam is used to determine the distance to the target. By providing a point cloud of distance measurements in this manner an image of the object can be constructed. A LIDAR system that performs such range finding typically includes a laser beam source, an element to provide scanning of the light beam, and detector(s) for detecting beam reflections.

LIDAR systems are used in many applications, such as mapping terrain using aerospace vehicles, self-driving or autonomous vehicles, mapping stationary objects, constructing 3D models of rooms and other objects for use in a variety of computer applications including, for example, games, social media, communications applications, etc. For many applications there is an interest in scanning the transmitted beam about a field-of-view (FOV) of a full 0 to 360°, such as for autonomous unmanned aerospace vehicles, manned aerospace vehicles, and self-driving vehicles.

To scan a light beam in a LIDAR system, movable mechanical components are typically employed. In many cases, the light beam scanning component is a mirror that is rotated to direct a fixed beam of light towards the mirror, or the light beam source is mounted on a gimbal and the gimbal is rotated. In one design, a mirror is mounted to an electromechanical component, such as a piezoelectric element, and is controlled to change the direction it faces. Regardless of the mechanical and/or electrical component that provides the force to produce the change in the beam direction, a physical change of position of the mirror or of the beam source itself is employed. If there are mechanical movable parts, the system runs a higher risk of mechanical failure. Also, the speed of rotation is limited by these mechanics as well as the usual wear considerations for a component expected to perform a very large number of cycles over its lifetime. Alternately, multiple LIDAR systems could be combined to cover the full 0 to 360° FOV.

There is an increasing demand for LIDAR systems that have no movable parts and provide an instantaneous FOV over the full range of azimuthal angles from 0 to 360° at low cost. This demand is generally driven by the desire to produce an imaging and ranging system for manned and unmanned autonomous land, air and sea vehicles, including guidance systems for self-driving vehicles as well as systems for terrain mapping and structure mapping. However, it is challenging to achieve a full 0 to 360° projected scanning range in a single LIDAR system without using movable parts.

Micro-electrical mechanical system (MEMS) devices have been employed to scan the beam in a LIDAR system. While the amplitude of oscillations of MEMS devices are small and the frequency of the scanning is high such that there is lower risk for mechanical failure, the scanning FOV is typically limited. Optical phased array technology is an emerging technology, but the scanning FOV is also limited and ranging distance is relatively short. Liquid crystal scanners are known to be used for this purpose, but require active electrical control of the liquid crystal and they have small angular range. There have been fundamental scientific studies showing a resonator effect for a low reflectivity SPPR device. These systems offer a number of advantages and disadvantages for providing a 360° FOV. However, there still exists a need for an optical scanner that can scan a light beam about a substantial FOV without using movable components, especially if operated at high scan rates.

U.S. patent application Ser. No. 15/928,347, filed Mar. 22, 2018, titled, Scanning An Optical Beam About A Field of Regard With No Moving Parts, assigned to the assignee of this disclosure and herein incorporated by reference, discloses employing a spiral phase plate resonator (SPPR) as a 0 to 360° scanning mechanism with no movable parts for a LIDAR system. An SPPR device is a miniaturized optical element for which a coherent superposition of optical vortices can be generated by either reflecting light off of the device or transmitting light through the device. Because the SPPR device is based on the interference of optical vortices in a single SPPR it has many advantages compared to other popular devices that generate optical vortices, including the compactness of the SPPR device, high power tolerance, the ability to generate optical vortices in the reflective or transmission configuration, as well as resilience to vibrations and misalignment.

SUMMARY

The following discussion discloses and describes a method for scanning a frequency modulated transmitted beam through a 360° FOV and processing beams reflected off of a target from a LIDAR system to determine a distance between the LIDAR system and the target, where the LIDAR system includes a transmitter sub-system and a receiver sub-system. The method generates a laser beam to be transmitted by the transmitter sub-system at a first frequency, determines a temperature of optical and electro-optical components in the transmitter and/or receiver sub-systems, and adjusts the first frequency of the laser beam to compensate for changes in the temperature of the optical and electro-optical components in the transmitter and/or receiver sub-systems. The method directs the laser beam to a spiral phase plate resonator (SPPR) device in the transmitter sub-system having opposing reflective surfaces that reflect the laser beam back and forth in the SPPR device, where one of the reflective surfaces includes a spiral step index that causes multiple internal reflected beams having different phases to be combined as a transmitted beam emitted from one side of the SPPR device and having a coherent superposition of optical vortex intensity patterns and a processing beam emitted from an opposite side of the SPPR device and having a coherent superposition of optical vortex intensity patterns. The method directs the transmitted beam from the SPPR device onto a conical mirror to direct the transmitted beam at a certain angle therefrom depending on the first frequency of the laser beam, shifts the frequency of the laser beam to a second frequency to change the angle that the transmitted beam is directed from the conical mirror, and frequency modulates the laser beam at the second frequency over a frequency modulation range. A reflected beam from the target is received at the receiver sub-system, and the method mixes and correlates the transmitted beam and the reflected beam, and calculates a fast Fourier transform of signals representing the mixed transmitted and reflected beams. The method determines beat frequencies in the mixed and transformed signals, identifies intermediate frequencies in the beat frequencies, estimates a time delay between the transmitted beam and the reflected beam from the beat frequencies to determine the distance to the target, and determines a Doppler shift frequency from the beat frequencies to determine the velocity of the target. The method then shifts the optical frequency of the laser beam to a plurality of other frequencies to change the angle that the transmitted beam is directed from the conical mirror over a complete 360° scan, and repeats the steps of frequency modulating, receiving a reflected beam from the target, mixing and correlating, calculating a fast Fourier transform, determining beat frequencies, identifying intermediate frequencies, estimating a time delay and determining a Doppler shift frequency for each separate optical frequency.

Additional features of the disclosure will become apparent from the following description and appended claims, taken in conjunction with the accompanying drawings.

BRIEF DESCRIPTION OF THE DRAWINGS

FIG. 1 is an isometric view of a LIDAR system including an SPPR device for providing a full 360° FOV;

FIG. 2 is a front view of a transmitter sub-system in the LIDAR system;

FIG. 3 is a top view of the transmitter sub-system;

DETAILED DESCRIPTION OF THE EMBODIMENTS

The following discussion of the embodiments of the disclosure directed to a method for scanning a frequency modulated transmitted beam through a 360° FOV and processing beams reflected off of targets is merely exemplary in nature and is in no way intended to limit the disclosure or its applications or uses.

As will be discussed in detail below, the present disclosure describes a LIDAR system including a transmitter sub-system, a receiver sub-system, and a signal processor sub-system. The transmitter and receiver sub-systems are synchronized to provide feedback to each other via signal processors. The signal processor sub-system also computes the relevant quantities and outputs a point cloud of ranging distances.

Figure 4:
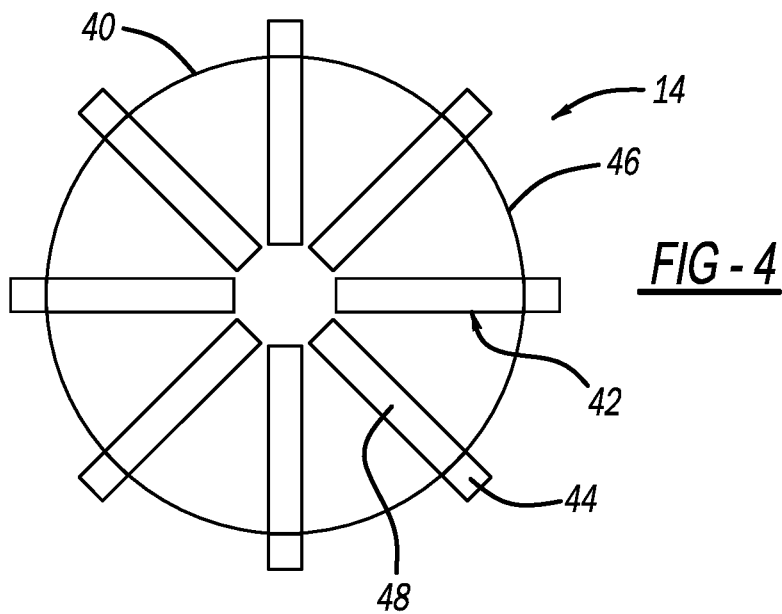
FIG. 4 is a cross-sectional top view of a receiver sub-system in the LIDAR system.

FIG. 1 is an isometric type diagram of a LIDAR system 10 that includes a transmitter sub-system 12 and a receiver sub-system 14. FIG. 2 is a front view and FIG. 3 is a top view of the transmitter sub-system 12 and FIG. 4 is a top, cross-sectional type view of the receiver sub-system 14. The transmitter sub-system 12 includes a narrow linewidth coherent laser beam source 20, such as a distributed feedback (DFB) laser, where the source 20 can be frequency tuned and operate in a rugged environment with limited mode hopping, and that emits a coherent laser beam 18, for example, in the visible-IR frequency range to an optoelectronic architecture 16 that includes various optical components depending on the particular application. For example, the architecture 16 may include an optical isolator to prevent back reflection of the laser beam 18 into the laser beam source 20. Specifically, light reflected back into the laser beam source 20 may cause beam jitter in the laser cavity causing intensity fluctuations of the output laser beam 18 or spurious frequency shifts in the laser wavelength, which could cause instability of the modes in the laser cavity and cause the laser beam source 20 to go out of lock. The beam 18 from the optical isolator is fiber coupled into a modulator, for example, an acousto-optic modulator (AOM), that modulates the laser beam intensity and a drive circuitry keeps track of the timing of the laser pulse modulation. The architecture 16 may also include a waveguide, such as an optical fiber, that maintains the beam 18 in a single optical mode, for example, the $TEM_{00}$ Gaussian mode. In an alternate embodiment, other optical elements instead of the single mode optical fiber can be employed to provide the $TEM_{00}$ Gaussian mode. The architecture 16 may also include a polarizing beam splitter (PBS) that separates a light beam based on its polarization, discussed in further detail below, and a polarization rotator (PR). Although a DFB laser is the laser beam source 20 in this embodiment, a plurality of other narrow linewidth or pulsed laser sources are suitable such as frequency tunable diode lasers, frequency tunable fiber lasers, external cavity lasers, and distributed Bragg reflector (DBR) lasers. Depending on the output of the laser beam source 20, and possibly the power rating of the other electro-optical components, an optical amplifier could be included before the PBS for high output power.

The single mode beam 18 is sent through an etalon 22 and into an SPPR device 26 that modifies the shape of the beam 18 and emits it towards a conical reflector 24 to be scanned in a 360° FOV, where the scan direction is based on an increasing or decreasing optical frequency of the laser beam 18. Speckle at the target can be avoided by using a diffuser around the conical reflector 24 or engineering rough surfaces on the conical reflector 24. The '347 application referenced above provides a more detailed discussion of the SPPR device 26 in this context. The SPPR device 26 includes an optically transparent block 28, such as glass, and a step-wise spiral reflector 32, such as a polymer layer having a reflective material coating, with an azimuthally varying step 36 having height Δh on an output side of the block 28 that is also optically transmissive enough so that an output beam can propagate therethrough and be output from the device 26. Although smooth reflective material coatings are employed in this design to provide reflective surfaces on the block 28, in alternate designs nanoscale structures can be used to provide the reflectivity of the beam 18 in the block 28.

If the beam 18 propagated through the block 28 with no surface reflectivity, an optical vortex beam with a well-defined winding number would be produced on the output plane of the device 26, where the device 26 would act as a spiral phase plate. By providing finite reflectivity on opposing surfaces of the device 26 and providing the reflector 32 having the gradually varying azimuthal thickness, the device 26 operates as a spiral phase plate resonator, where the beam 18 is output from the device 26 as a coherent superposition of optical vortices separated by specific positive winding numbers. In other words, each reflection of the beam 18 within the device 26 creates an individual optical vortex beam having a unique phase that is output from the device 26.

The receiver sub-system 14 includes a cylindrical housing 40 that houses the various processors and electrical hardware associated with the system 10 discussed below. A number of detector modules 42 each including a fast and sensitive detector 44, such as avalanche photodiodes (APD) or silicon photomultiplier (SiPM), are mounted to the housing 40 in a certain configuration so that the detector 44 is on an outer surface 46 of the housing 40, such as in suitable rows and columns, to be in a position to detect the reflected beam off of the target of interest in any beam direction. In a different embodiment, single photon avalanche photodiodes (SPAD) could also be used. Each detector module 42 includes a circuit board 48 that extends into the housing 40. While a network of thirty-six single pixel detectors are provided to cover the full 360° FOV in this embodiment, where the columns of the detectors 44 are 30° apart on the housing 40, there could be a different number of detectors in a plurality of arrangements for the detector's field-of-view.

Figure 5:
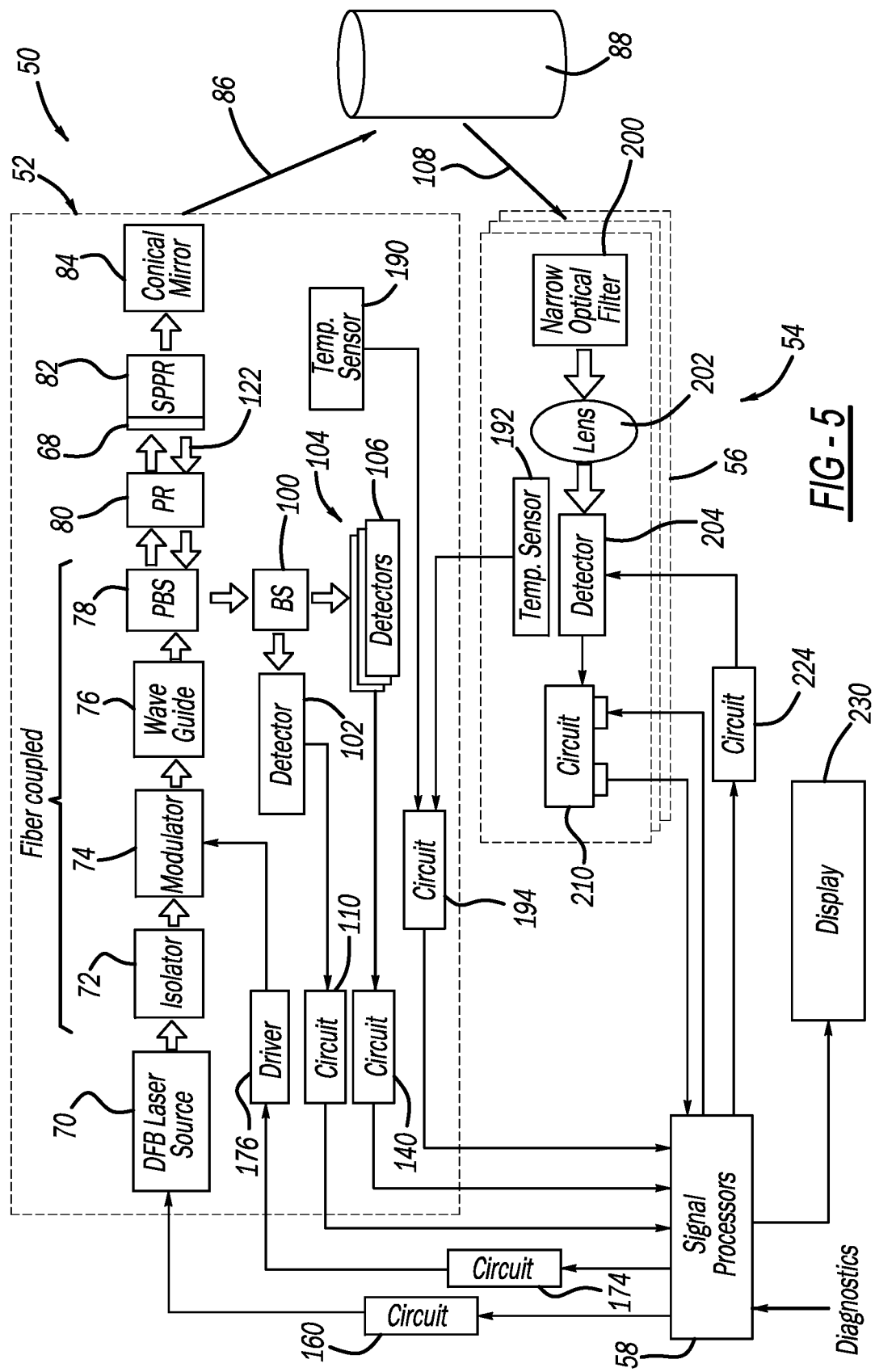
FIG. 5 is a schematic block diagram of the LIDAR system showing the transmitter sub-system that transmits an amplitude modulated scanned laser beam and the receiver sub-system that receives and processes using direct detection a reflected beam from a target.

FIG. 5 is a schematic block diagram of a LIDAR system 50 that represents one non-limiting example of the LIDAR system 10, where the system 50 includes a transmitter sub-system 52, a receiver sub-system 54 including a plurality of detector modules 56 and a signal processor sub-system 58. The transmitter sub-system 52 includes a laser beam source 70, an isolator 72, a modulator 74, a waveguide 76, a PBS 78, a PR 80, an SPPR device 82 mounted to a high finesse etalon 68 and a conical mirror 84 that provides a 360° FOV transmitted and scanned beam 86 in the manner discussed above that is reflected off of an object 88 as reflected beam 108 to be received by the receiver sub-system 54 so that the distance to the object 88 can be determined. It is noted that although not specifically shown the laser beam 86 generated by the laser beam source 70 would likely be amplified by an optical amplifier. The forward propagating laser beam at every stage through the transmitter sub-system 52 and being transmitted will be referred to as the beam 86 below.

The beam 86 from the modulator 74 is fiber coupled into the waveguide 76 by a collimator (not shown) at the end of the waveguide 76, and into the PBS 78. The PR 80 rotates the polarization of the beam 86 by 45° during each passage of the beam 86 into the device 82. More specifically, for a light beam that goes through the PR 80 in the forward direction then back through the PR 80 in the backward direction, the polarization is rotated by 90°. The beam 86 is then coupled into the SPPR device 82, where a backward propagating beam 122 due to a weak reflection from the SPPR device 82 is created, for which the orientation of the beam 86 is internally determined. The combination of the PR 80 and the PBS 78 reduces the backward propagating beam 122 going to the laser beam source 70. The reflected beam 122 from the SPPR device 82 is polarization rotated by the PR 80 to have a different polarization than the incoming beam 86 so that it is reflected by the PBS 78 instead of being transmitted through it. The transmitted beam 86 emerging from the SPPR device 82 is collimated and the beam 86 is reflected off the conical mirror 84 into the desired FOV.

Figure 6:
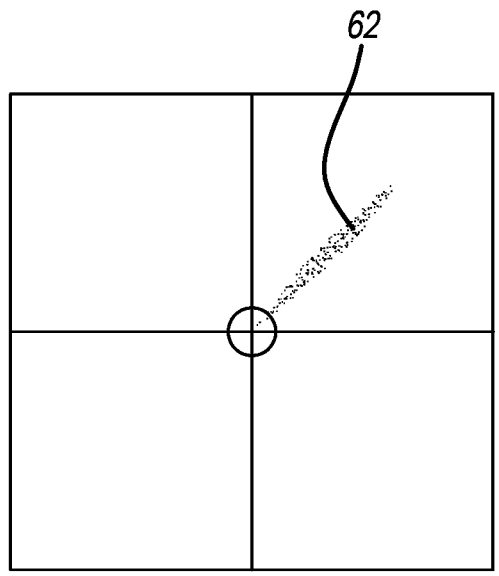
FIG. 6 is an illustration of the transmitted laser beam on the output plane of the SPPR device in the transmitter sub-system.
Figure 7:
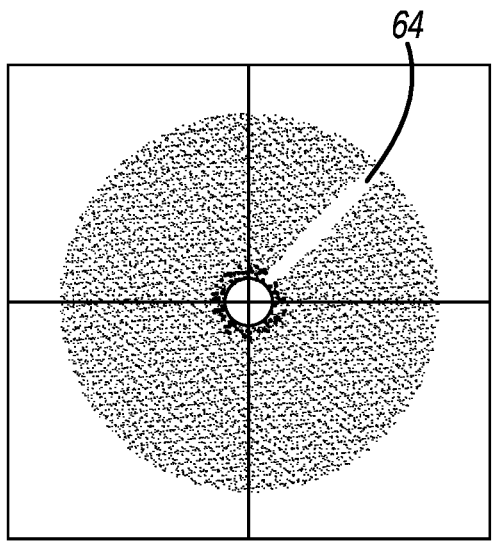
FIG. 7 is an illustration of a reflected laser beam on the input plane of the SPPR device.
Figure 8:
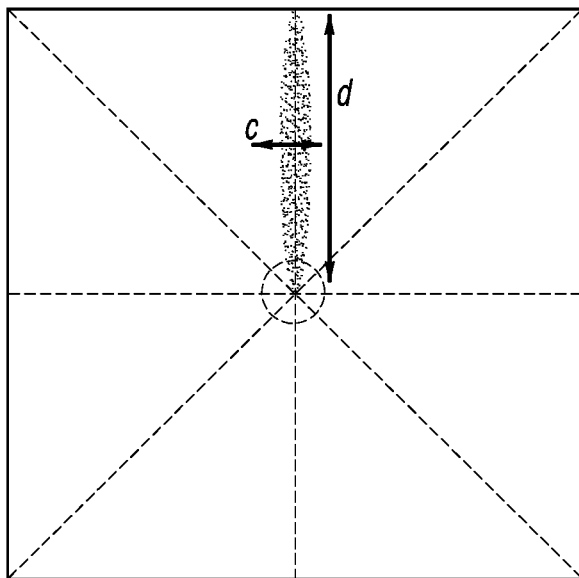
FIG. 8 is an illustration showing a horizontal c and vertical d field-of-view of the transmitted laser beam.

FIG. 6 is an illustration of the transmitted laser beam 86 at the output plane of the SPPR device 82 showing a light area 62 in the direction of the beam 86, FIG. 7 is an illustration of the reflected laser beam 122 at the input plane of the SPPR device 82 showing a null 64, and FIG. 8 is an illustration of the beam 86 showing a horizontal c and vertical d field-of-view.

Scanning of the beam 86 is achieved by the SPPR device 82 in the transmitter sub-system 52 according to:

$$\phi_0 = 2\pi \frac{h_0}{\Delta h} \frac{1}{v} \delta v, \quad (1)$$

where $\phi_0$ is the angular position of the optical beam emerging from the transmitter, $\delta v$ is the change in laser frequency, $v$ is the center laser frequency, $\Delta h$ is the azimuthal step height of the device 82, and $h_0$ is the substrate height. Equation (1) assumes that $\Delta h \ll h_0$, which is typical for most SPPR designs, and the device 82 has uniform refractive index.

The rotation rate of the beam 86 is defined as:

$$\frac{d\phi_0}{dt} = 2\pi \frac{h_0}{\Delta h} \frac{1}{v} \frac{\delta v}{dt}. \quad (2)$$

From the above equations, it is clear that the scan rate of the laser beam 86 is directly proportional to the rate of change of the frequency of the laser beam. Because the laser beam source 70 can be tuned quite fast, the tuning rate is exemplified in the 360° scanning of the beam 86.

If the beam 86 is broadened to cover the entire tuning range of the SPPR device 82 without the etalon 68, the beam 86 emerges from the conical mirror 84 in the entire 360° FOV simultaneously, thus degrading the scan resolution. The etalon 68 serves as an optical filter if a tunable broadband laser is used, nevertheless, the increments in laser beam frequency tuning allows for changing the orientation of the beam 86 within a 360° angle. Alignment is maintained through the optical components in the transmitter sub-system 52. This is because most of the optical elements are fiber coupled to each other with a small air gap between the optical elements from the PBS 78 to the SPPR device 82. This allows for preserving the back reflected optical mode that gives information on the orientation of the beam 86. The air gap is large enough to allow for decay of the evanescent field and reject internal scattered light, but small enough to keep the system compact. The optical elements surrounding this air gap are rigidly held in place to avoid movement. This alignment is expected to be maintained even in the presence of system vibrations.

The signal processor sub-system 58 coordinates and synthesizes the digital signals going into the transmitter and receiver sub-systems 52 and 54. This includes the timing of the pulses, modulation frequency, the magnitude of the beam 86, and phases of the electronic signals for the transmitter and receiver sub-systems 52 and 54. It also provides a platform for heterodyning transmitter and receiver electronic digital signals. In other words, the transmitter and the receiver signals that are obtained by direct detection are electronically mixed to determine the time delay of the amplitudes of the signals. The sub-system 58 may include a flexible digital signal processor (DSP) having a field programmable gate array (FPGA), which can generate, receive and synthesize signals. The FPGA digital processors have built-in finite pulse response filters (and other filters), fast Fourier functions, discrete cosine functions, as well as built-in addition, subtraction and accumulation units to efficiently combine multiplications results. The processors also have multiple input/output interfaces to communicate with the transmitter and receiver sub-systems 52 and 54, and interfaces for external memory, and other controls. Multiple FPGAs can be connected in parallel for fast processing. In a different embodiment, microcontroller units or graphical processing units (GPU) can be used as the digital signal processors, or parts of the digital signal processors.

Figure 9:
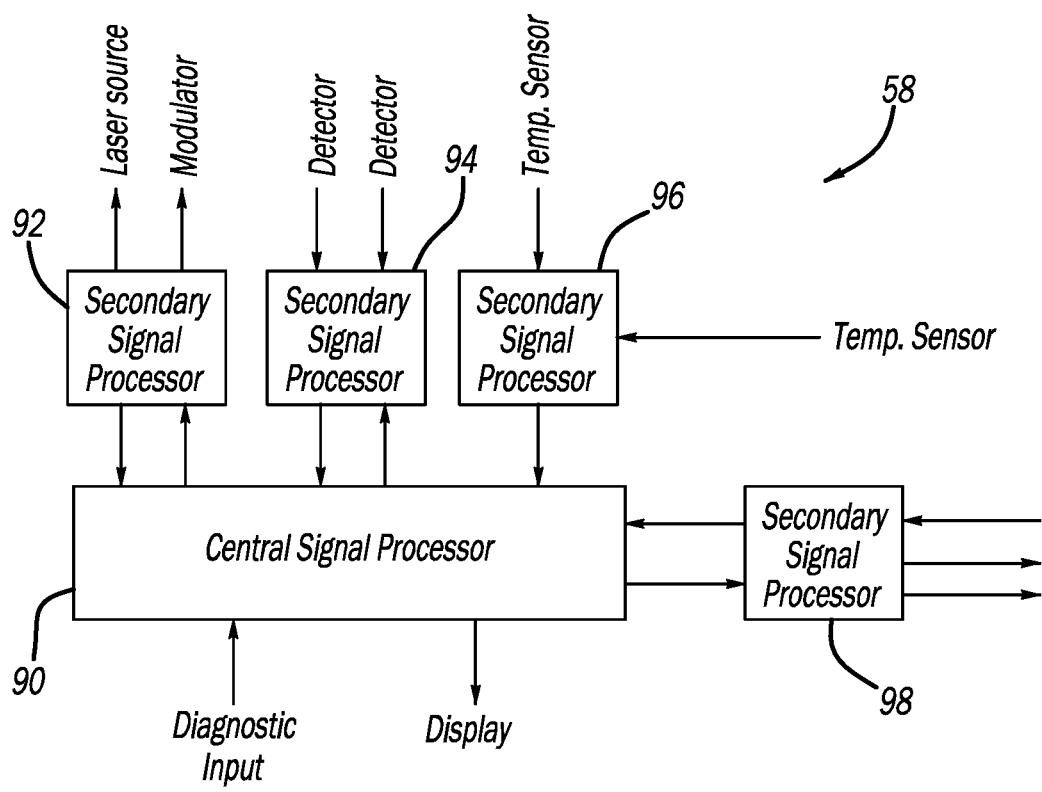
FIG. 9 is a block diagram of a processor sub-system in the LIDAR system including a central signal processor and secondary signal processors interfacing with the transmitter and receiver sub-systems.

There are several secondary signal processors which interface with the components in the transmitter and receiver sub-systems 52 and 54. The secondary processors are connected with a central signal processor that computes the signal outputs using a number of algorithms. FIG. 9 is a block diagram of the signal processor sub-system 58 that includes a central signal processor 90, a secondary signal processor 92 that controls the laser beam source 70 and the modulator 74, a secondary signal processor 94 that receives and processes detector signals discussed in detail below, a secondary signal processor 96 that receives temperature signals from transmitter sub-system and receiver sub-system temperature sensors also discussed in detail below and a secondary signal processor 98 that controls the receiver sub-system 54. The various processor clocks are also synchronized for appropriate timing. There is also an input to the central signal processor 90 to run diagnostics on the system 50.

Select algorithms implemented by the central signal processor 90 in conjunction with the secondary signal processors 92, 94 and 96 include an algorithm to scan the transmitted beam from 0 to 360° and detect the reflected beam 108 by the receiver sub-system 54, an algorithm for internal tracking of the beam position, an algorithm for switching between different single pixel detectors, and an algorithm for reporting the temperature of the transmitter and receiver sub-system 52 and 54. The exchange between the signal processor 92 and the central signal processor 90 controls the scanning of the frequency of the laser beam 86, as well as the timing of the modulator 74. The exchange between the secondary signal processor 94 and the central signal processor 90 controls the integration times for the detectors, discussed below, in the transmitter sub-system 52, as well as the determination of the initial orientation of the transmitted beam 86, and periodic calibration and locking of the beam orientation to the wavelength of the beam 86. The exchange between the central signal processor 90 and the secondary signal processor 96 controls the detectors in the detector modules 56, including the bias voltage for switching between the detector modules 56, as well as timing and gain of the reflected beam 108. There could be variable integration times for the detector modules 56. The exchange between the secondary signal processor 98 and the central signal processor 90 read the chip temperature of the transmitter and receiver sub-systems 52 and 54, and correct any temperature induced changes. It is noted that the signal processors 92, 94, 96 and 98 exchange information through the central signal processor 90. A more detailed discussion of these algorithms is given later in this discussion.

The reflected beam 122 from the PBS 78 is split by a beam splitter 100, where one of the split beams is sent to a detector 102 and the other split beam is sent to a detector assembly 104 including a number of detectors 106 in the transmitter sub-system 52. The detector 102 is a fast detector, such as a fast diode, that keeps track of the timing and the intensity modulation of the beam 86 in the SPPR device 82, as well as any shifts in the longitudinal modes through a change in free spectral range of the etalon 68 that may occur. The electrical signals from the detector 102 are conditioned by a circuit 110 before being sent to the secondary signal processor 94.

Figure 10:
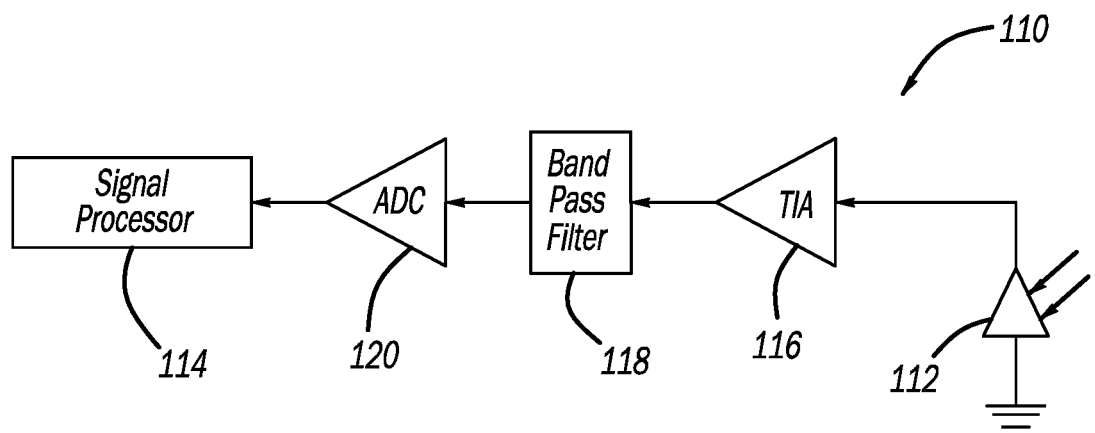
FIG. 10 is a schematic diagram of a circuit showing signal processing elements for detectors in the transmitter sub-system.

FIG. 10 is a schematic diagram of the circuit 110 that processes the electrical signals from the detector 102, where the detector 102 is illustrated as a diode 112 and the secondary signal processor 94 is illustrated as a signal processor 114. The electrical signal from the diode 112 is amplified by a transimpedance amplifier (TIA) 116, band-pass filtered by a band-pass filter 118 and then converted to a digital signal by an analog-to-digital converter (ADC) 120. The electrical signal from the detector 102 modifies the signal provided to the laser beam source 70 and select parts of the receiver sub-system 54. Some of the electrical signals from the transmitter sub-system 52 are mixed with the electronic signal from the appropriate detector modules 56 in the receiver sub-system 54 for distance range determination, and error correction.

The angle orientation of the beam 86 as it is reflected off of the conical mirror 84 into the FOV is internally measured by the detector assembly 104. More specifically, the orientation angle is measured internally by measuring a weak back reflection from the SPPR device 82. The detector assembly 104 forms the internal mechanism for recognizing the beam's azimuthal angle in real time, as well as for calibrating and locking the wavelength to the angular position of the transmitted beam 86. The feedback provided to the secondary signal processor 94 also allows for appropriate power cycling among the detector modules 56 in the receiver sub-system 54.

Figure 11:
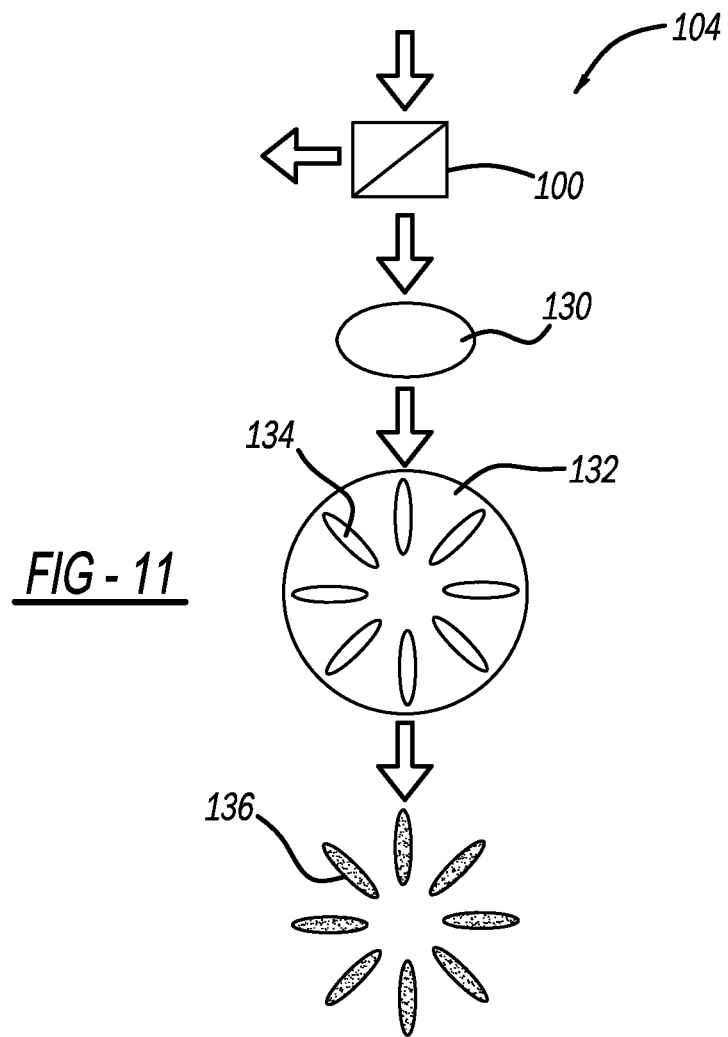
FIG. 11 is an illustration of a detector in the transmission sub-system that determines the orientation of the scanned beam.

FIG. 11 is a schematic diagram of the detector assembly 104 showing the beam splitter 100 splitting the reflected beam 122. The reflected beam 122 is then projected into the diffraction far field using a short focal length lens 130, such as a GRIN lens. An aperture device 132 is placed behind the lens 130 and includes eight apertures 134 that are individually fiber coupled into eight single pixel detectors 136, such as fast diodes. As the frequency of the laser beam 86 is tuned from one frequency to another, light will not go through one or more of the apertures 134. Since each aperture 134 is fiber-coupled into its corresponding detectors 136, the detector 136 that reads the null 64 is indicative of the beam's azimuthal angle, and thus the detector 136 also reads the corresponding scanning projection angle of the beam 86.

Although the detector assembly 104 includes eight detectors 136 separated by 45°, there could be more or less single pixel detector and aperture combinations. To improve accuracy and precision, the aperture-detector combination could be arranged along a circle in an asymmetric fashion. That is, some aperture-detector combinations are separated by 45° while others are separated by smaller or larger angles with more significant figures. That way, once these angles are known, the exact initial orientation of the beam is also known.

Figure 12:
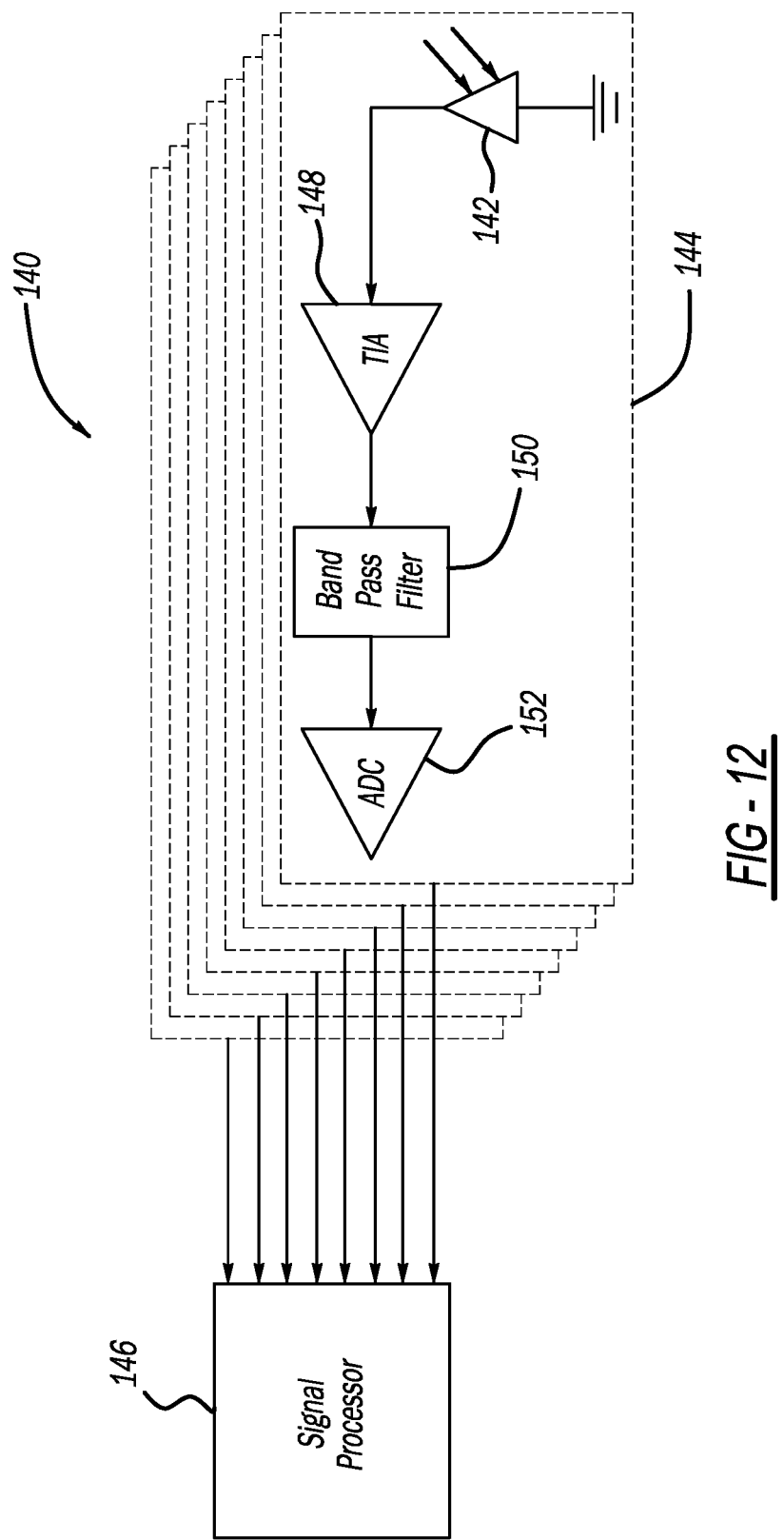
FIG. 12 is a schematic diagram of a circuit showing signal processing elements for the signal generated by the detector shown in FIG. 11.

The electrical signals from the detectors 136 are provided to a circuit 140 to be processed before being sent to the secondary signal processor 94. FIG. 12 is a schematic diagram of the circuit 140 showing the specific elements and including a detector module 144 for each of the detectors 136 and a signal processor 146 representing the secondary signal processor 94. Each detector module 144 includes a transimpedance amplifier 148 that receives and amplifies the signal from the detector module 144, a bandpass filter 150 that filters the amplified signal and an analog-to-digital converter (ADC) 152 that converts the amplified and filtered signal to a digital signal. The digital signals from all of the detector modules 144 are sent to the signal processor 146 so that the system 50 knows the orientation of the beam 86 as the wavelength of the laser beam 86 from the laser beam source 70 is changed.

Figure 13:
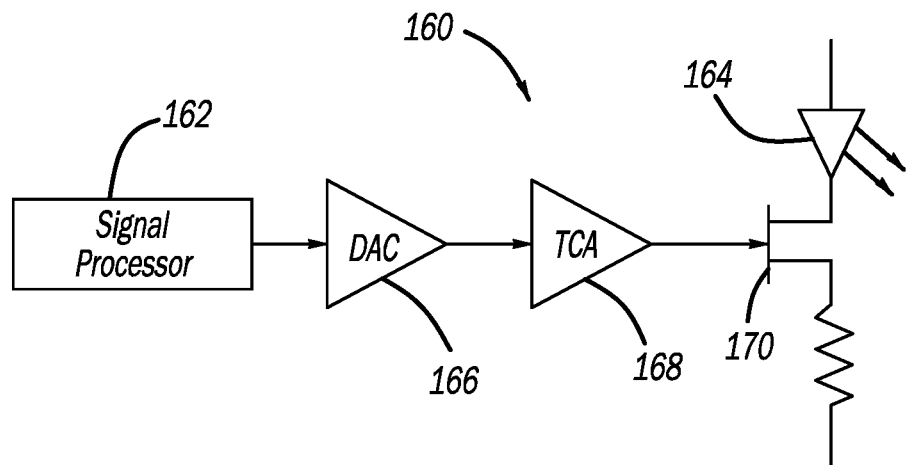
FIG. 13 is a schematic diagram of a circuit for controlling the frequency of a DFB laser beam source in the transmitter sub-system.

The secondary signal processor 92 sends a signal to the laser beam source 70 to tune the frequency of the beam 86 through a circuit 160. FIG. 13 is a schematic diagram of the circuit 160 and showing a signal processor 162 representing the secondary signal processor 92 and a diode 164 representing the laser beam source 70. The digital tuning signal from the signal processor 162 is converted to an analog signal by a DAC 166 and is then amplified by a transconductance amplifier 168 that controls an FET switch 170 to provide power to the diode 164. At a specified start time, the DFB laser wavelength is tuned by changing the diode current to the diode 164, or via a suitable command signal.

The modulator 74 provides amplitude or intensity modulation of the laser beam 86. The signal that drives the modulator 74 is also generated by the secondary signal processor 92 and is provided to the modulator 74 through a circuit 174 and a driver 176, where the circuit 170 would include a DAC for converting the digital signal from the processor 92 to an analog signal. It is noted that the laser beam 86 could be directly intensity modulated by an AOM or a Mach-Zehnder modulator could be employed to modulate the intensity with even higher bandwidths. Similar to an AOM, a bias would be applied to the Mach-Zehnder modulator.

Figure 14:
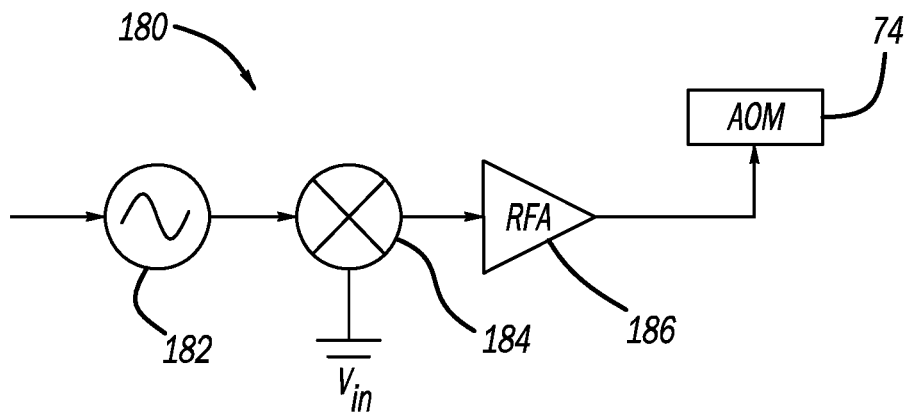
FIG. 14 is a schematic diagram of a circuit for controlling a driver that controls a modulator for modulating the laser beam in the transmitter sub-system.

FIG. 14 is a schematic diagram of a circuit 180 that could be used in place of the circuit 174 and includes an amplitude modulator 182 that receives the digital signal from the processor 92, a mixer 184 that receives the amplitude modulation signal, and a radio frequency amplifier 186 that amplifies the modulation signal.

Figure 15:
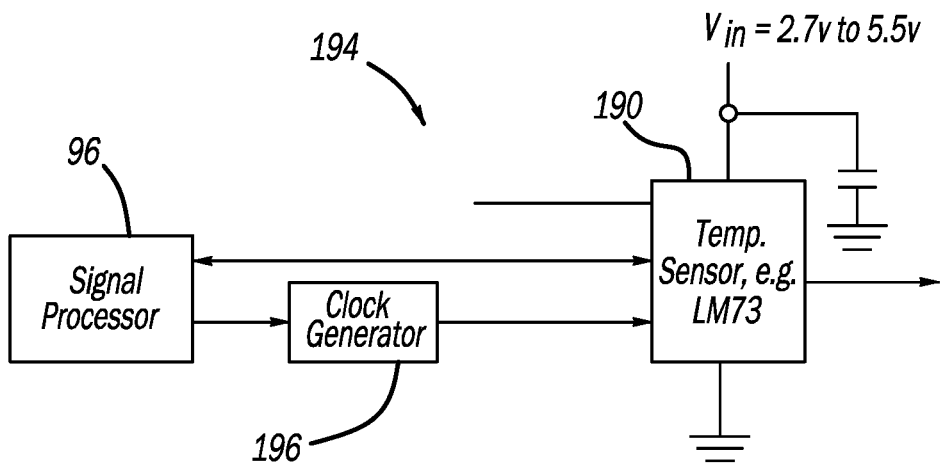
FIG. 15 is a block diagram of a circuit that reads the temperature of the transmitter sub-system and the temperature of the receiver sub-system.

A temperature sensor 190 measures the temperature of the transmitter sub-system 52 and a temperature sensor 192 in each detector module 56 measures the temperature of the receiver sub-system 54. The temperature measurements are provided to a circuit 194 shown generally in FIG. 15 that includes a clock generator 196. Periodic updates of the temperature from the transmitter sub-system 52 adjust the wavelength of the laser beam 86 to compensate for any slow thermal drifts experienced by the SPPR device 82 and the laser beam source 70. The back reflection from the etalon 68 also provides similar information through shifts in the longitudinal modes, i.e., a change in the free spectral range of the SPPR device 82, on a very slow time scale compared to the fast time scales of the intensity modulations for distance ranging. With specialized algorithms, the thermo-optic effects in the SPPR device 82 are not expected to result in deleterious measurements. This is because the time scales that the laser beam frequency is changing to rotate the beam 86 is much faster than the time scales for which there are temperature induced expansion of the SPPR device 82. One algorithm for reading the temperature to correct for any possible thermally induced laser frequency shifts and expansion of the SPPR device 82 is discussed later in this description.

The beam 86 from the transmitter sub-system 52 travels to the object 88, and is reflected back as the reflected beam 108 into the receiver sub-system 54 where it is detected by one or more of the detector modules 56. A narrow band-pass optical filter 200 is placed in front of each of the modules 56 to significantly reduce any surrounding background light, e.g. sunlight. The frequency of the laser beam 86 is tuned over a relatively narrow range Δv compared to the center laser frequency $v_0$ to change the direction of the transmitted beam 86. This can be quantified by the fractional change in optical frequency $$\frac{\Delta v}{v_0}$$

going into the SPPR device 82. The narrow frequency range emerging from the transmitter sub-system 52 allows for the band-pass filter 200 to be much narrower than 1 nm, thus rejecting significant background light. A lens 202 is placed in front of a single pixel detector 204 in each module 56 and will constrain the detector's FOV, thus further reducing background light, e.g. sunlight. In an alternate embodiment, the light from the lens 202 is coupled into each detector 204 through an optical fiber.

Figure 16:
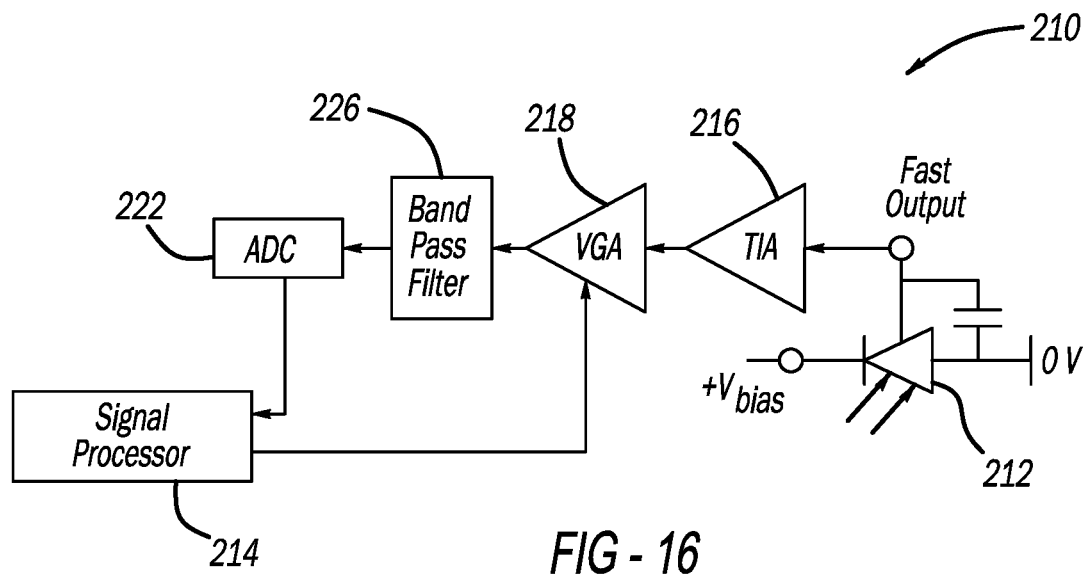
FIG. 16 is a schematic diagram of a circuit for processing the reflected beam from the target in a receiver module.

The electrical signals from the detectors 204 are sent to the secondary signal processor 98 through a circuit 210 shown in FIG. 16, where the signal processor 98 is shown by a signal processor 214 and the detector 204 is shown by diode 212. Particularly, the signal from the diode 212 is amplified by a transimpedance amplifier (TIA) 216 and a variable gain amplifier (VGA) 218, where the VGA 218 receives a gain signal from the signal processor 214, filtered by a band-pass filter 226 and then converted to a digital signal by an ADC 222.

Figure 17:
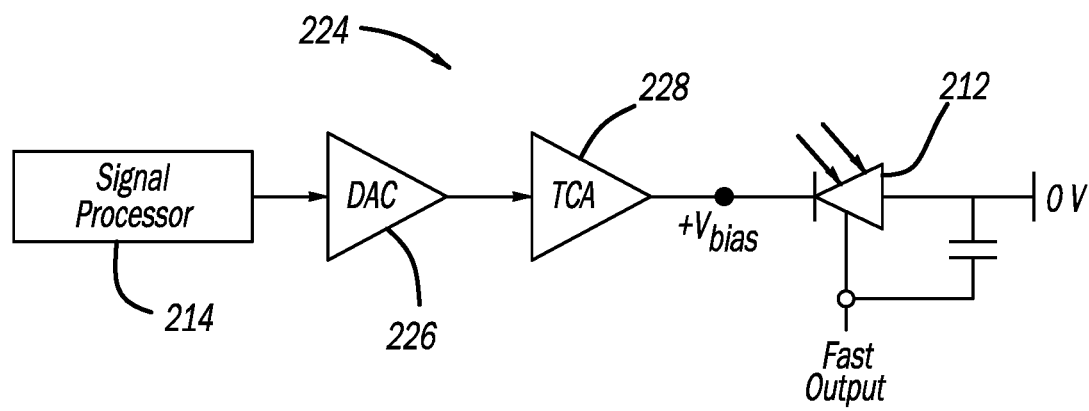
FIG. 17 is a schematic diagram of a circuit for providing a bias voltage input to a single pixel detector.

The secondary signal processor 98 determines the appropriate gain level for the detector 204 through the VGA 218, and the appropriate modulation bias of the detector 204 through a circuit 224 to turn the detector 204 on or off. FIG. 17 is a schematic diagram of the circuit 224 showing a modulation bias signal from the signal processor 214 being converted to an analog signal by a DAC 226, and then amplified by a TCA 228 before being sent to the diode 212. Turning the detectors 204 on and off, i.e., power cycling, at appropriate times is critical for low power operation. In an alternate embodiment, time to digital converters (TDC) could be used to directly convert pulse arrival times to the digital output for the signal processors.

Figure 18:
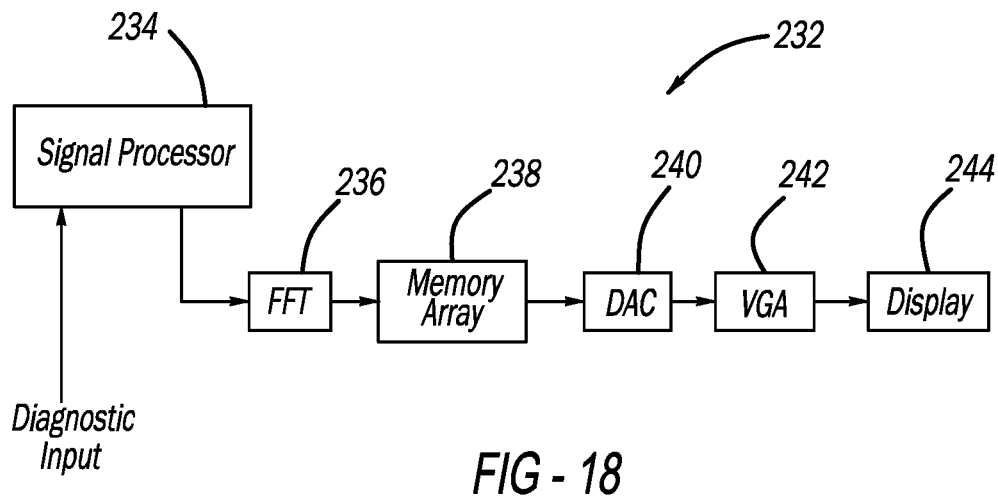
FIG. 18 is a block diagram of a display system for displaying a point cloud of range data.

The central signal processor 90 displays the range finding information on a display 230. FIG. 18 is a schematic block diagram of a system 232 showing how the range finding information can be displayed. The data from the signal processor 90, represented by a signal processor 234, is sent to a Fast Fourier Transform (FFT) module 236 that converts the data to the frequency domain and then to a memory array 238 for storage. The digital data from the memory array 238 is then converted to analog data by a DAC 240, which is then amplified by a VGA 242 and displayed on a display 244.

For some 0 to 360° FOV LIDAR systems, there may be cross-talk between different transmitter emitters and receiver detectors, where light emitted by one laser source is inadvertently received by a different detector. The 360° FOV LIDAR system based on an SPPR device in the transmitter alleviates this issue as there is only one transmitter that can scan a laser beam in the full 360° FOV, and each angle of the outward propagating beam is locked to a corresponding receiver angle FOV. Switching between the different receiver detectors 204 as the laser beam is scanned prevents cross-talk, thus reducing erroneous values in distance range estimation.

In order to allow the system 50 to scan the beam 86 from 0 to 360° and detect the reflected beam 108 from the object 88, the laser beam source 70 generates the laser beam 86 at frequency $v_1$, which corresponds to an orientation of the beam 86 reflected off of the mirror 84 at angle $\phi_1$, where $v_1 \infty \phi_1 \varepsilon [0, 2\pi]$. The frequency $v_1$ is the first frequency of the laser beam 86 to obtain the beam orientation at angle $\phi_1$. After temperature compensation, the signal processor 92 sends a command signal to increase/decrease the diode current of the source 70 to change the frequency of the laser beam 86 to frequency $v_2$. At frequency $v_2$ the laser beam 86 is then amplitude or intensity modulated at modulation frequency $\Omega_0$ by the modulator 74 for time $\tau_2$ with N modulated intensity pulses. The laser beam frequency $v_2$ corresponds to a well-defined beam angle $\phi_1$ propagating from the transmitter sub-system 52. The clock in the processor 92 sends signals to the transmitter optical components, i.e., the laser beam source 70 and the modulator 74, to generate N pulses or modulations. This electronic signal is also synchronized with the processors 94 and 96, which send electronic signals to turn the relevant detector modules 56 on and off in the receiver sub-system 54. To ensure a high signal-to-noise ratio, including mitigation of multipath interference, the modulator 74 is then modulated at several different intensity modulation frequencies, i.e., $\Omega_1, \Omega_2, \Omega_3, \ldots$, for the laser beam frequency $v_2$ and the laser beam 86 is synchronized with the detector modules 56 that are "on" in the receiver sub-system 54, see FIG. 21 discussed later. The distance range is then computed from the cross-correlation of the electronic digital signal sent to modulate the beam 86 in the transmitter sub-system 52, electronic digital signals receiver signals from the receiver sub-system 54 that is determined from the returned optical intensity incident on the column of detector modules 56, and a reference signal that is internally generated by the signal processor 92. In some cases, the reference signal is the same as the modulated electronic transmitted signal. This cross-correlation is performed by the digital signal processor 92 to track the phase between the transmitted signal and the received signal, and consequently calculate the range to the object 88. The above steps are repeated for frequencies $v_3, v_4, v_5 \ldots v_N$ of the laser beam 86 until the beam 86 traces out the full 0 to 360°, i.e., $\phi_3, \phi_4, \phi_5, \ldots, \phi_N = 2\pi$ rad. The point cloud for distance ranging to targets that reflect the transmitted beam 86 is calculated and displayed. For the purpose of improving the lateral resolution, the laser beam frequency can be dithered at each angle while scanning the beam 86.

The azimuthal reflection angle of the beam 86 is internally tracked in the transmitter sub-system 52. The back reflection of the beam 86 from the SPPR device 82 is indicative of the beam orientation on the output plane of the SPPR device 82. The position of each fast detector 136 corresponds to the angle $\phi_1$ of the beam 86 emerging from the transmitter sub-system 52. One of the fast detectors 136 reads the back reflected beam, i.e., a null signal, and reports the beam angular position to the signal processor 94. A weighted cross-correlation between the digital signal from the detector optical signal and the digital signal that corresponds to a particular laser frequency (laser current) is performed by the processor 92, which locks wavelength to orientation on the output plane of the SPPR device 82. This is a dynamic locking scheme of the beam orientation to wavelength. For a good measurement, the position of the transmitted beam 86 emerging from the system 50 is reported. For a bad measurement, the frequency of the laser beam 86 is tuned in increments and the steps are performed again until a good measurement is obtained. The time to perform this operation should be shorter than the time it takes the beam 86 to make a full 360° scan. After initial calibration measurement, this measurement is performed at successive time intervals within the scanning of the beam 86 through the 360° FOV. This ensures precise and accurate angles of the beam 86 emerging from the transmitter sub-system 52, as well as appropriate power cycling of the detectors 204.

An algorithm switches different ones of the single pixel detectors 204 in the receiver sub-system 54 to an on state and an off state depending on the angular position of the beam 86 emitted from the transmitter sub-system 52. For the specific frequency of the laser beam 86 that corresponds to the current or a command signal going into the laser beam source 70, the processor 92 changes the present position of the laser beam 86 to a new position of the laser beam 86. The bias voltage that corresponds to the new detector position is turned on, and the bias voltage that corresponds to the old detector position is turned off. If a column of the detector modules 56 receives too much light from the reflected beam 108, then the algorithm integrates for a shorter period of time and reduces the peak intensity of the beam 86 from the transmitter sub-system 52. If the detector 204 receives too little light from the reflected beam 108, the algorithm integrates for a longer period of time. The algorithm alternates between integrating for a short time and a long time for each scan angle. This enables more sources of noise to be rejected while ensuring fast operation speeds.

For reporting a change in temperature, the digital signal processor 96 reads the initial temperature from the sensors 190 and 192. From these measurements, the number and width of the longitudinal modes in the SPPR device 82 is estimated for which the free spectral range of the SPPR device 82 is calculated. For a change or shift in the longitudinal modes in the SPPR device 82, as well as a temperature change from the sensors 190 and 192 in the sub-systems 52 and 54, respectively, the algorithm adjusts the frequency of the laser beam 86 in the transmitter sub-system 52, and the bias voltage of the detector modules 56 in the receiver sub-system 54. The time interval for which the temperature is read is determined from the transmitter scan speed.

Figure 19:
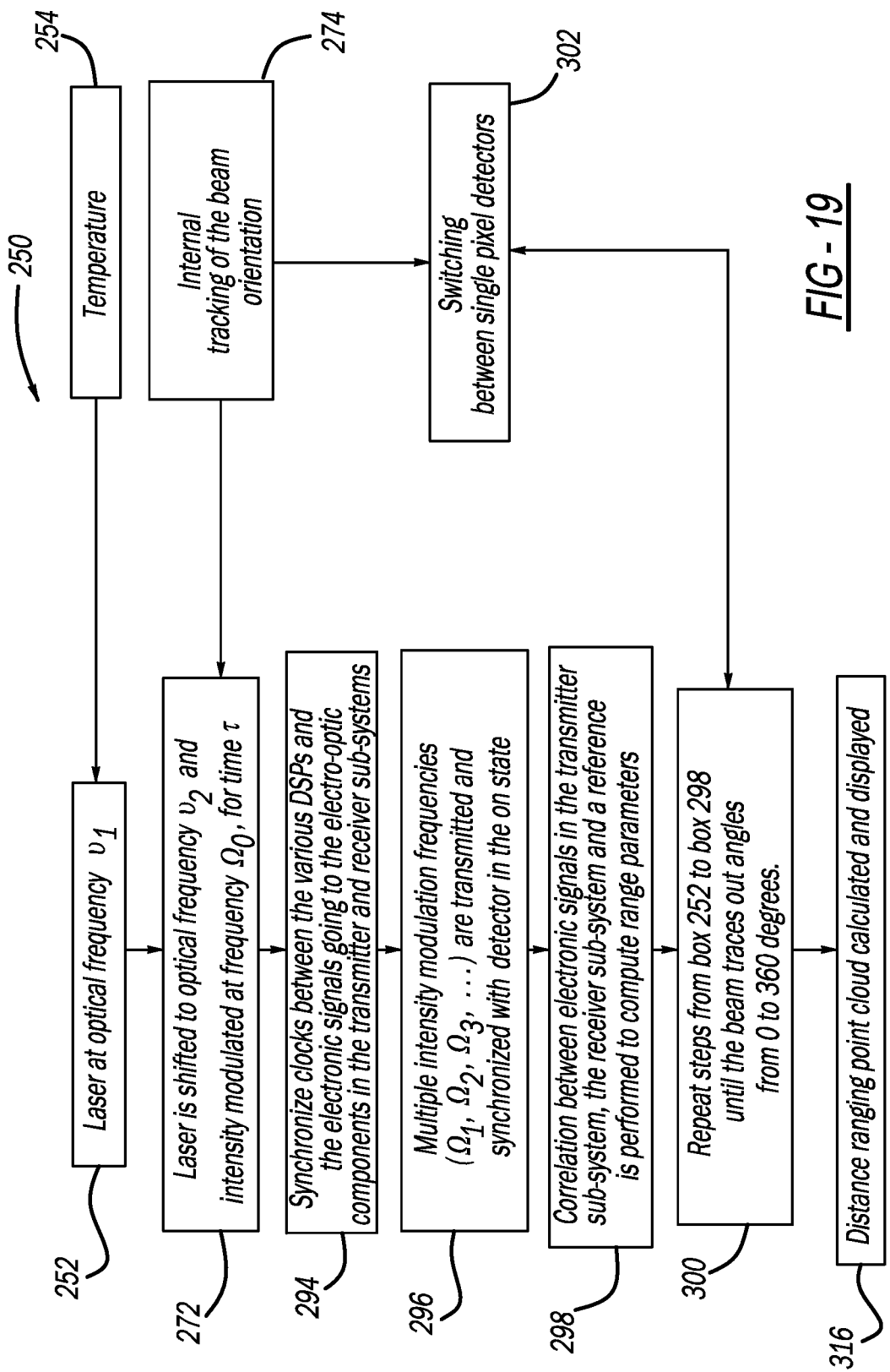
FIG. 19 is a flow chart diagram showing an operation of the LIDAR system depicted in FIG. 5.

The discussion above is illustrated by the following flow chart diagrams. FIG. 19 is a flow chart diagram 250 showing the operation of the LIDAR system 50 as discussed above. At box 252, the algorithm sets the optical frequency $v_1$ of the laser beam 86 generated by the laser beam source 70 based on the temperature of some of the individual critical components of the transmitter sub-system 52 and the receiver sub-system 54 provided at box 254. The purpose of determining the temperature is to ensure that any change in temperature that induces thermo-optic effects in the optical and electro-optical components as well as electronic components is adequately compensated. Most of the electronic components already have built in temperature sensors including the digital signal processors.

Figure 20:
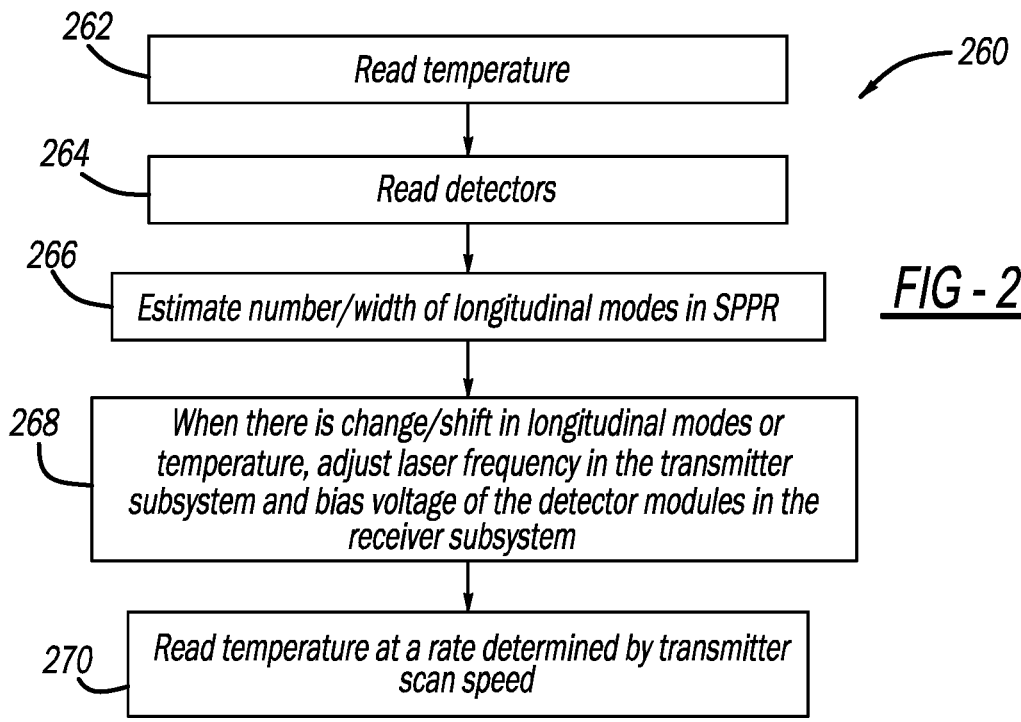
FIG. 20 is a flow chart diagram showing a process for how the algorithm obtains the temperatures of the transmitter sub-system and the receiver sub-system.

FIG. 20 is a flow chart diagram 260 showing a process for how the algorithm obtains the temperatures of the transmitter sub-system 52 and the receiver sub-system 54. The algorithm operating in the secondary signal processor 96 reads the temperature measurements from the sensors 190 and 192 at box 262 and the algorithm operating in the secondary processor 94 reads the output of the detectors 102 and 104 at box 264. The algorithm then estimates the number and the width of the longitudinal modes in the SPPR device 82 at box 266. From this measurement, the free spectral range of the SPPR device 82 can be determined. When there is a change or shift in the longitudinal modes in the SPPR device 82 from the free spectral range, or the temperature measurements from the sensors 190 and 192, the algorithm changes the frequency of the laser beam 86 and the bias voltage of the detector modules 56 in the receiver sub-system 54 at box 268. The algorithm then reads the temperature at a rate determined by the scan speed of the beam 86 at box 270.

Returning to FIG. 19, the algorithm then shifts the optical frequency of the beam 86 to frequency $v_2$ and then intensity modulates the beam 86 at the intensity modulation frequency $\Omega_0$ for time $\tau$ at box 272. The algorithm then internally tracks the intensity modulated beam 86 that is transmitted towards the object 88 at box 274.

Figure 21:
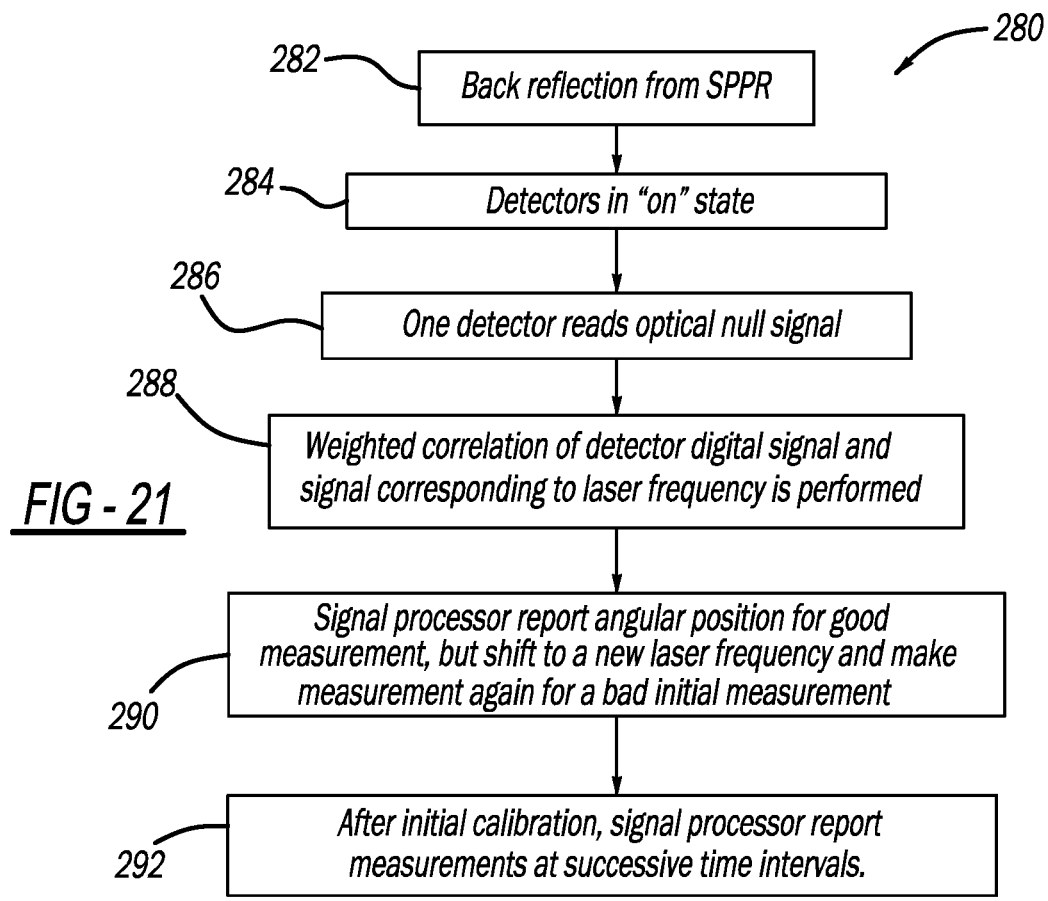
FIG. 21 is a flow chart diagram describing internal tracking and locking of beam orientation to wavelength in the LIDAR system depicted in FIGS. 5 and 27.

FIG. 21 is a flowchart diagram 280 showing how the algorithm provides internal tracking of the beam 86. The algorithm monitors the reflected beam 122 from the SPPR device 82 at box 282, puts the detectors 204 in the on state at box 284 and reads the reflected beam 108 at one of the detectors 204 at box 286. The algorithm then provides a weighted correlation of the detector digital signal and the signal corresponding to the laser beam frequency $v_2$ at box 288. The algorithm then reports the angular position of the laser beam 86 for a good measurement, and shifts to the frequency of the laser beam 86 and makes a measurement again for a bad initial measurement at box 290. After an initial calibration, the algorithm reports the measurements at successive intervals at box 292.

Again returning to FIG. 19, the algorithm then synchronizes the clocks in the processors 90, 92, 94, 96, 98, 114, 146, 162, 214 and 234 and the electronic components in the opto-electronic components in the transmitter sub-system 52 and the receiver sub-system 54 at box 295. The algorithm then systematically intensity modulates the laser beam 86 at multiple intensity modulation frequencies $\Omega_1, \Omega_2, \Omega_3, \ldots, \Omega_N$ and synchronizes the intensity modulated laser beam 86 with the detector modules 56 at box 296. This synchronization occurs by the processors 90, 92, 94, 96, 98, 114, 146, 162, 214 and 234 sending electronic signals to the detectors 204 in the on state to receive the return optical intensity pulses for which there are return electronic signals to the processor, and sending signals to the laser beam source 70 and the modulator 74. The algorithm then performs a correlation between the electro-optic element signals, i.e., the laser beam source 70 and the modulator 74, in the transmitter sub-system 52, the detectors 204 in the receiver sub-system 54 and reference signals generated by the signal processor 90 to compute range parameters to the object 88 at box 298. The processes from boxes 252, 272, 204, 296 and 298 is then repeated at box 300 for different laser beam frequencies $v_3, v_4, v_5 \ldots v_N$ for a 360° FOV. This operation requires using different ones of the detector modules 56, where switching between the modules 56 occurs at box 302.

Figure 22:
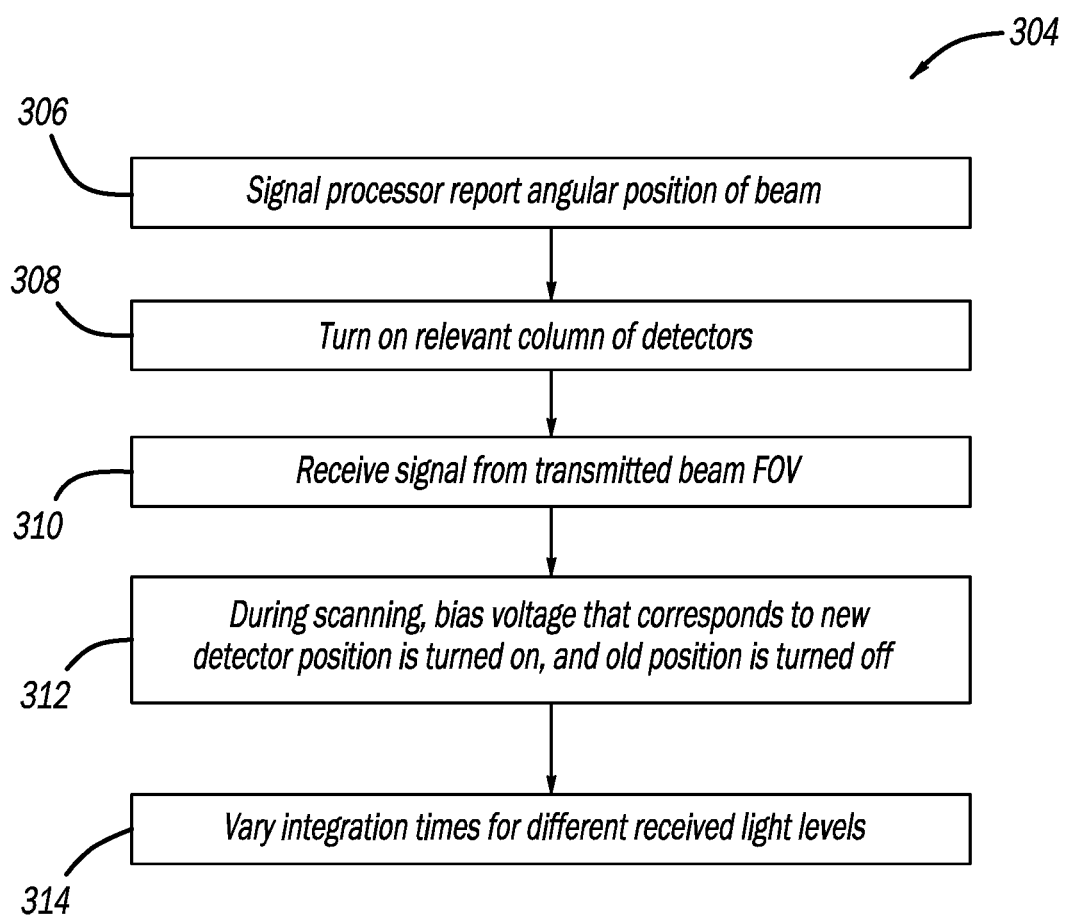
FIG. 22 is a flow chart diagram describing switching between different single pixel detectors.

FIG. 22 is a flow chart diagram 304 showing the process for switching or power cycling between different ones of the detectors 204. At box 306, the algorithm reports the angular position of the beam obtained from the flow chart diagram 280. At each laser frequency, one or more columns of the detectors 204 are in the "on" state while the other detectors 204 are in the "off" state. The power cycling between the "on" and "off" states in the network of the detectors 204 reduces power dissipation and consequently reduces internal heating of the components. The spatial position of the transmitted laser beam 86, which is proportional to the frequency change of the laser beam 86, determines the column of the detectors 204 that would be turned "on" from their "off" state during the angle scanning of the laser beam 86. This is done by synthesis of the internal signals from the detector assembly 104 in the transmitter sub-system 52 for which the signal processor 98 returns a bias voltage through the circuit 224 to perform switching operations for the detector modules 56. The response speed of these single pixel detectors exceeds tens of megahertz, and thus power cycling between the detectors 204 is quite fast. The algorithm then turns on the proper column of the detectors 204 at box 308 and receives the reflected beam 108 at box 310. During the scanning process, the algorithm turns on the bias voltage that corresponds to the new detector position and the old detector position is turned off at box 312. The integration times are varied at box 314 for different received light levels. The distance ranging point cloud of the object 88 is then calculated and displayed at box 316.

The system 50 discussed above uses amplitude or intensity modulation of the laser beam 86 to extract the distance range point cloud of the object 88. In an alternate embodiment, the system 50 can be modified to extract the distance range point cloud of the object 88 by using frequency modulation of the laser beam 86. Frequency modulating a laser beam in a LIDAR system to obtain range and velocity of a target is known in the art. However, the present disclosure combines that technique with the SPPR device 82 to provide 360° scanning with no moving parts. Advantages of the frequency modulation method include unambiguously extracting distance and velocity information from the same optical signal, and most importantly long distance and high resolution ranging. In this embodiment, the modulator 74 does not amplitude modulate the laser beam 86 relative to the travel time of the beam 86 to the object 88 and back, but serves to add a frequency bias to the beam 86 by modulating the intensity of the beam 86 with a long square pulse to gate the transmitted laser beam 86 and the reflected beam 108 for noise rejection and timing synchronization.

In a LIDAR system of this type employing beam frequency modulation, the frequency of the laser beam 86 is modulated by a linear triangular waveform over a frequency range of $\Delta F = F_2 - F_1$, where $F_1$ and $F_2$ are the start (lower) and the stop (higher) frequencies, respectively, of the waveform for the beam 86. The time delay $\Delta t$ from transmitting the laser beam 86 to receiving the reflected beam 108 and the laser sweep rate $s_{laser}$, where:

$$s_{laser} = \frac{F_2 - F_1}{T}, \quad (3)$$

are used to determine the distance range $D_R$ to the object 88 from the frequency $f_{Dis}$, where:

$$f_{Dis} = \Delta t \, s_{laser} = \frac{2 D_R}{C} s_{laser}, \quad (4)$$

and where C is the speed of light, $$T = \frac{1}{2 f_{mod}}$$

is the time or period to modulate the laser beam frequency with a triangular waveform, $f_{Dis}$ is determined from intermediate laser beam frequencies $f_{IF1}$ and $f_{IF2}$, and $f_{mod}$ is the modulation frequency of the waveform driving the laser beam 86 over a certain time period.

If the object 88 is stationary, there will be one intermediate frequency $f_{IF1}$, but if the object 88 is moving there will be two intermediate frequencies $f_{IF1}$ and $f_{IF2}$, where the intermediate frequencies $f_{IF1}$ and $f_{IF2}$ are determined from the beat frequencies of representative optical signals of the mixed transmitted beam 86 to the object 88 and reflected beam 108 from the object 88. The distance to the object 88 is determined from the average of the intermediate frequencies $f_{IF1}$ and $f_{IF2}$ as:

$$f_{Dis} = \frac{f_{IF1} + f_{IF2}}{2}. \quad (5)$$

If the object 88 is moving, the velocity of the object 88 is related to the difference in the intermediate frequencies $f_{IF1}$, and $f_{IF2}$ by the Doppler shift as:

$$f_{IF1} - f_{IF2} = 2 f_{Doppler} = 2 \frac{V v_0}{C}, \quad (6)$$

where $f_{Doppler}$ is the Doppler shifted frequency, V is the velocity of the object 88, and $v_0$ is the center frequency of the laser beam 86.

Figure 23:
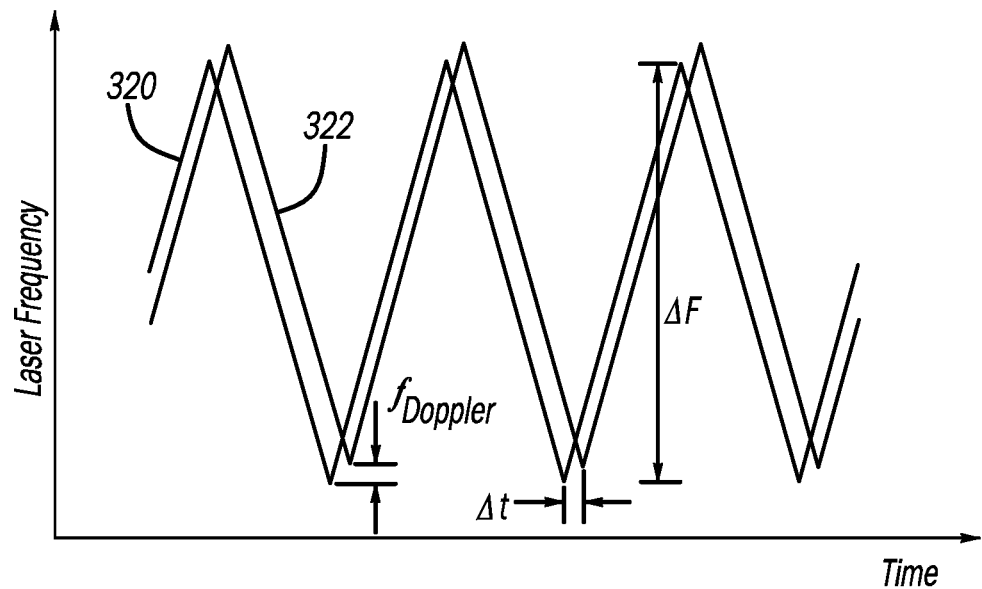
FIG. 23 is a graph with laser beam frequency sweep on the vertical axis and time on the horizontal axis showing frequency modulation of a transmitted beam in the LIDAR system depicted in FIG. 5 and a reflected beam off of a target.
Figure 24:
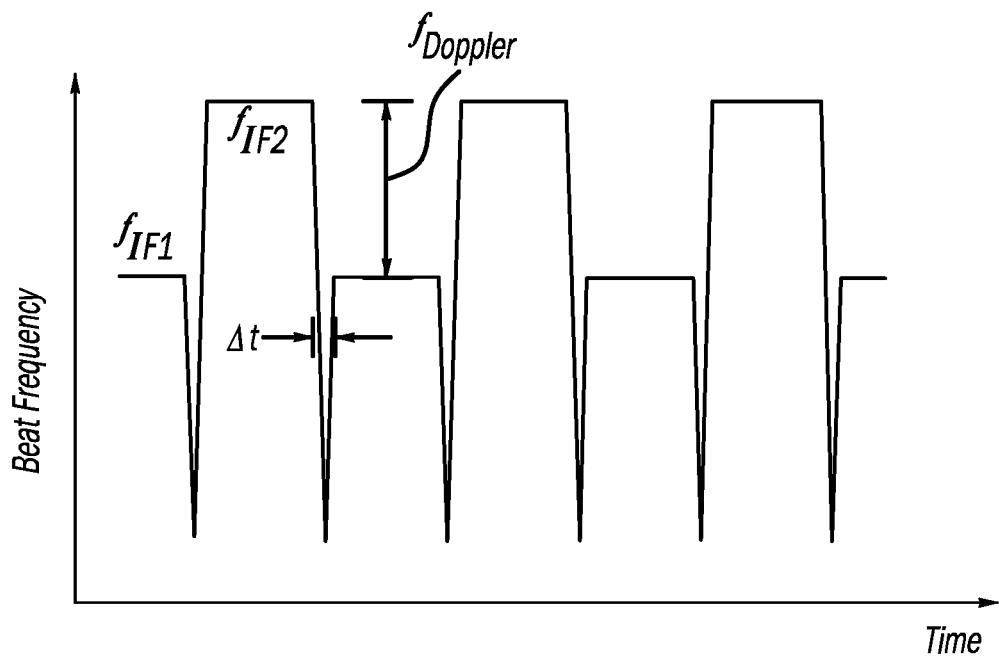
FIG. 24 is a graph with beat frequency on the vertical axis and time on the horizontal axis showing the optical beat frequency between the transmitted optical beam and the received optical beam vs time relationship due to the frequency modulated transmitted beam.

The relationship between the transmitted laser beam 86 that has been frequency modulated with a continuous or pulsed triangular waveform and the resulting reflected beam 108 based on the discussion above is illustrated by the graph in FIG. 23, where time is on the horizontal axis and frequency is on the vertical axis. Modulation of the laser beam 86 at a certain beam angle frequency v over a modulation frequency range $\Delta F$ is shown by graph line 320 and the reflected beam 108 is shown by graph line 322, where $s_{laser}$ is the slope of the lines 320 and 322. FIG. 24 is a graph with time on the horizontal axis and beat frequency on the vertical axis showing the beat frequencies in the beams 86 and 108 over time. The intermediate frequencies $f_{IF1}$ and $f_{IF2}$ are determined from mixing or correlating the reflected beam 108 from the object 88 with the transmitted beam 86. The reflected beam 108 from the object 88 can also be correlated with a local oscillator providing a reference signal. The time delay $\Delta t$ between the lines 320 and 322 and the intermediate frequencies $f_{IF1}$ and $f_{IF2}$ are used to determine the distance to the object 88 and the Doppler shift frequency $f_{Doppler}$ is used to determine the velocity of the object 88.

To provide the frequency modulation, the diode current that controls frequency of the beam 86 generated by the laser beam source 70 is tuned to change the narrow linewidth frequency of the laser beam 86, and hence rotate the transmitted laser beam 86 in the 360° FOV, where the coherence length of the laser beam 86 should be at least twice the ranging distance. Depending on the design parameters of the SPPR device 82, the frequency tuning range $\Delta v$ to scan the laser beam 86 over 360° could be anywhere from 10 s of GHz to 100 s of GHz. The signal processor sub-system 58 causes the laser beam source 70 to generate the laser beam 86 so that it systematically increases in frequency linearly in a stepped and ramped manner so that the laser beam 86 is projected into the 360° FOV. The signal processor sub-system 58 also places the small triangular modulating waveform on the linearly increasing laser beam frequency ramp to frequency modulate the laser beam 86 at each beam frequency v, where the frequency range $\Delta F$ of this triangular waveform will be on the order of 10 s of MHz, and where the amount of modulation does significantly change the angle that the beam 86 is reflected off of the mirror 84. This allows for high lateral resolution and obtaining a beat frequency between the frequency of the transmitted laser beam 86 and the frequency of the reflected beam 108 for distance measurement.

Figure 25:
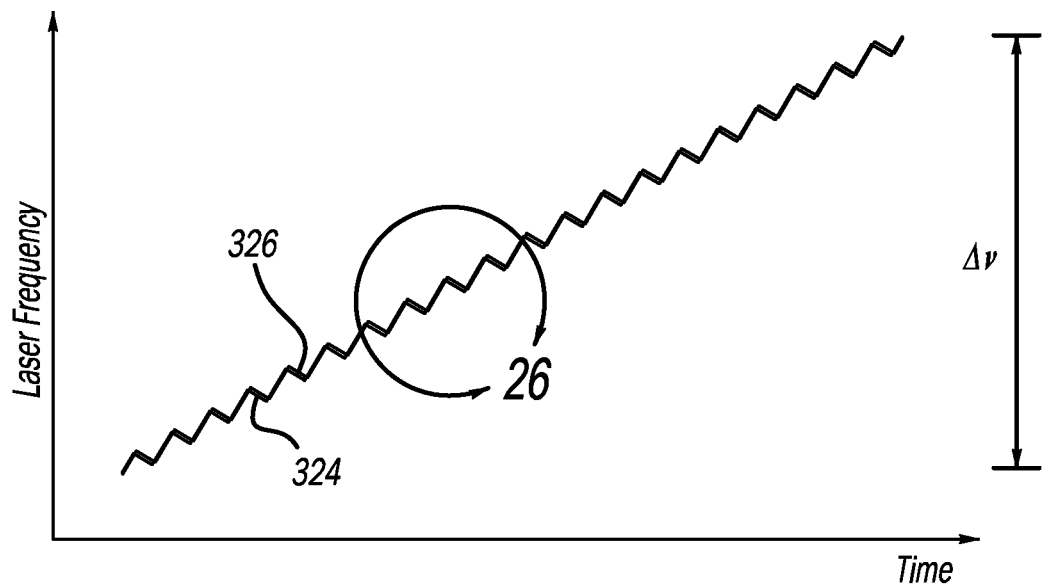
FIG. 25 is a graph with laser beam frequency on the vertical axis and time on the horizontal axis showing frequency modulation of a transmitted beam in the LIDAR system depicted in FIGS. 5 and 27 and a reflected beam off of the target over a stepped increasing scan in frequency of the transmitted beam for 360° scanning.
Figure 26:
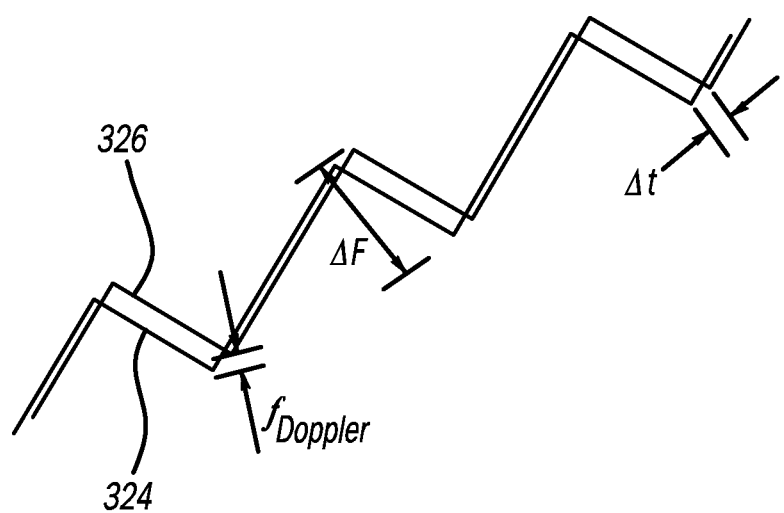
FIG. 26 is an expanded portion of the graph shown in FIG. 25.

This beam frequency and modulation control is shown by the graphs in FIGS. 25 and 26 that illustrates as the frequency of the transmitted laser beam 86 is stepped up in frequency over the frequency range Δv, the beam 86 is modulated with the triangular waveform. Graph line 324 is the transmitted laser beam 86 and graph line 326 is the reflected beam 108, where the graph of FIG. 25 is a blown up portion of the graph in FIG. 26.

The signal processor sub-system 58 obtains the time delay Δt between the transmitted beam 86 and the reflected beam 108. For the direct detection, the signal processor sub-system 58 also mixes the electronic signal of the transmitted and received frequency domain chirped pulses from the detectors 102, 106 and 204, and computes the fast Fourier transform (FFT) of the signal to extract the intermediate frequencies $f_{IF1}$ and $f_{IF2}$. The beat frequency of the modulated beam that is frequency tuned to rotate the beam 86 over a 360 degree angle will have a similar shape. The distance to and the velocity of the object 88 can then be computed.

The LIDAR system 50, whether it intensity modulates or frequency modulates the beam 86, provides direct detection of the reflected beam 108 in the receiver sub-system 54 as described. However, the receiver sub-system 54 can be replaced with a balanced receiver that provides coherent detection. In other words, the transmitted beam 86 and the reflected beam 108 are electrically mixed for beam synchronization and correlation purposes in the system 50. However, the transmitted beam 86 and the reflected beam 108 can also be optically mixed for the same purpose.

Figure 27:
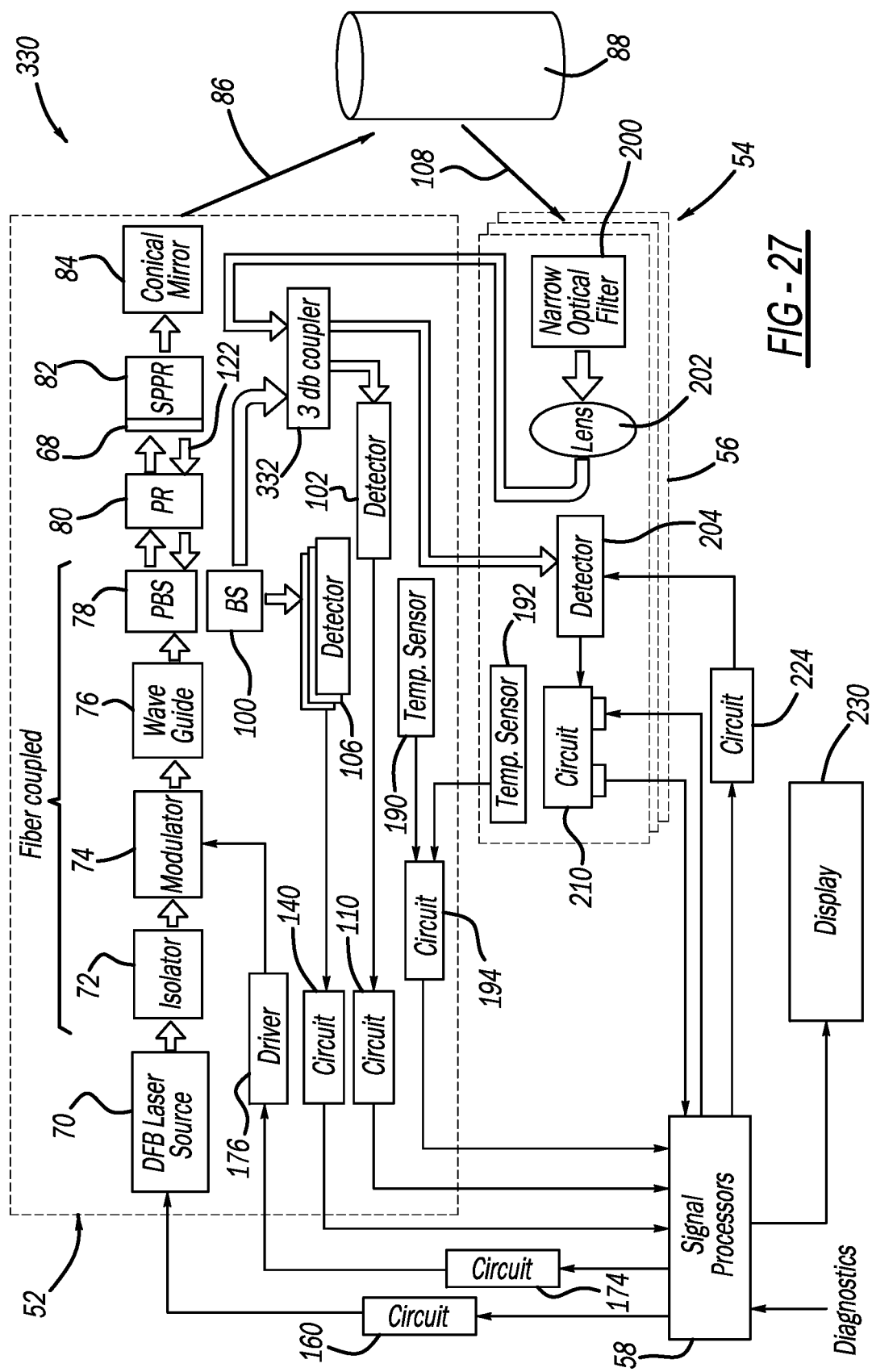
FIG. 27 is a schematic block diagram of a LIDAR system including a transmitter sub-system that transmits a frequency modulated scanned laser beam and a receiver sub-system that receives and processes a reflected beam from a target using heterodyne detection or homodyne coherent detection.

FIG. 27 is a schematic block diagram of a LIDAR system 330 that provides frequency modulation of the laser beam 86 in the manner discussed above, but where the transmitter sub-system 52 and the receiver sub-system 54 have been modified to provide heterodyne or homodyne coherent detection of the reflected beam 108 for optically mixing the transmitted beam 86 and the reflected beam 108 instead of direct detection, and where like elements to the system 50 are identified by the same reference number. In this embodiment, the split beam from the beam splitter 100 and the reflected beam 108 from the lens 202 are coherently or optically mixed in a 50-50 beam splitter 332, such as a 3 dB coupler, in the transmitter sub-system 52 so that the transmitted beam 86 and the reflected beam 108 are interfered with each other. The mixed beams are then sent to the detector 102 in the transmitter sub-system 52 to provide the beam tracking and the detectors 204 in the receiver sub-system 54 to provide the return beam detection. The signals from the detectors 102 and 204 are sent to the signal processor sub-system 58 that performs a FFT on the mixed signals from the detectors 102 and 204 to convert the signals to the frequency domain and generate beat frequencies as a function of time. The sub-system 58 then estimates the intermediate frequencies $f_{IF1}$ and $f_{IF2}$ from the beat frequencies, which are used to determine the distance to and velocity of the object 88 in the manner discussed herein. It is noted that in an alternate embodiment, the beam 86 can be intensity modulated as described above and the beam 86 and the beam 108 can be optically mixed using the beam splitter 332. Further, the techniques for internally track the rotation of the beam 86 (angle and rotation rate), and power cycling of the detectors 204 is largely the same for both coherent detection techniques and the direct detection techniques of the reflected beam 108.

Figure 28:
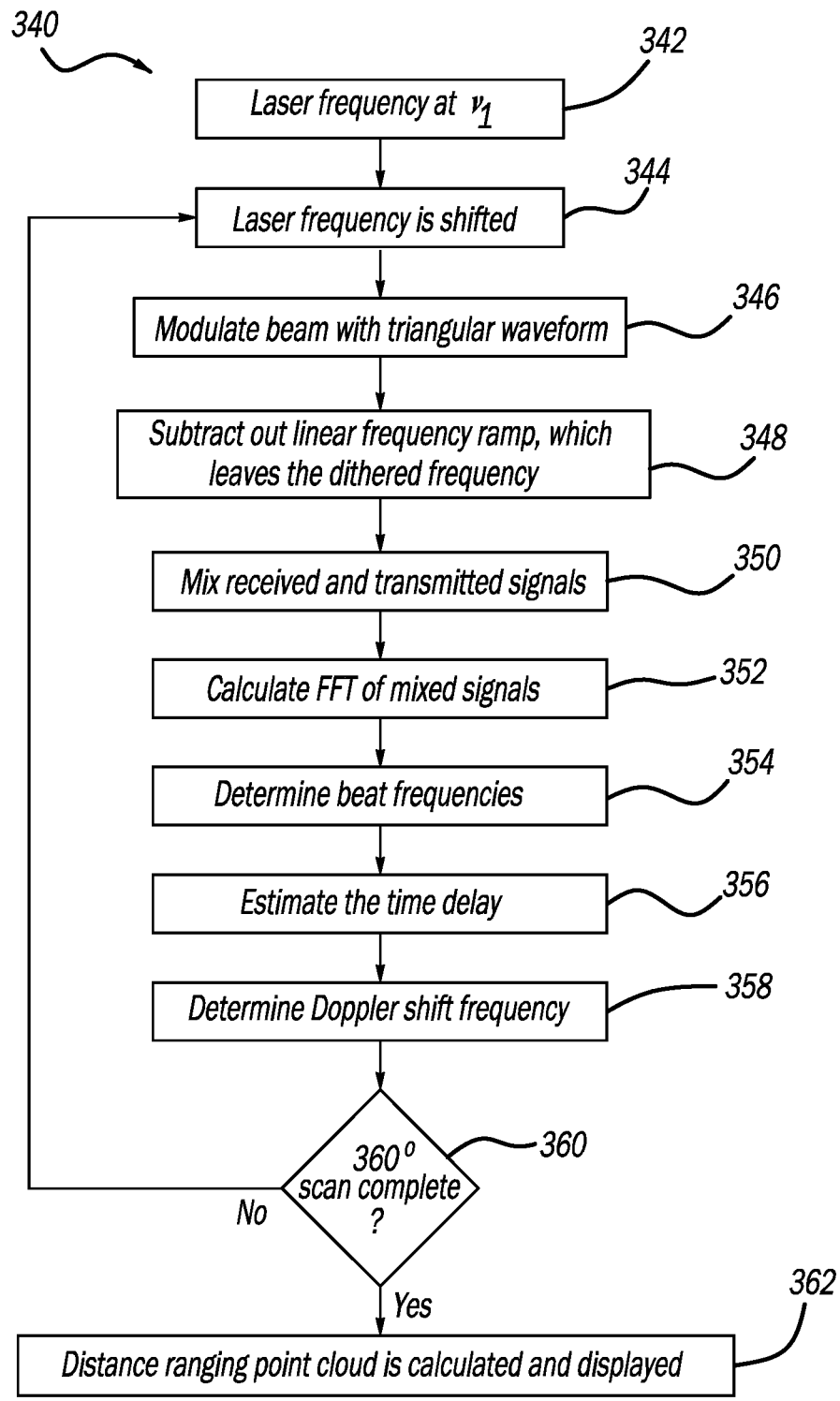
FIG. 28 is a flow chart diagram showing an operation of the LIDAR system depicted in FIG. 27.

FIG. 28 is a flow chart diagram 340 showing the processes and algorithms performed in the signal processor sub-system 58 for determining the distance to and the velocity of the object 88 using frequency modulation of the beam 86 for both the direct detection technique associated with the system 50 and the coherent detection technique associated with the system 330. At box 342, the algorithm sets the frequency $v_1$ of the laser beam 86 generated by the laser beam source 70 based on the temperature of the individual critical components of the transmitter sub-system 52 and the receiver sub-system 54, which provides a start angle ϕ of the beam 86 off of the mirror 84. The frequency of the laser beam 86 is shifted to the next frequency step, which is frequency $v_2$, to adjust the angle ϕ of the beam 86 off of the mirror 84 at box 344. The beam 86 at the frequency $v_2$ is modulated with a triangular waveform at the modulation frequency $f_{mod}$ over the frequency range ΔF at box 346, where the range ΔF of the modulation frequency $f_{mod}$ is ΔF«Δv, which prevents the beam 86 from walking off of the object 88 during distance ranging. For example, the system 50 or 330 can be designed so that the range ΔF of the modulation frequency $f_{mod}$ is on the order of tens or hundreds of MHz, and the change in the frequency range Δv of the laser beam 86 to provide the entire 360° FOV scan is tens of GHz or hundreds of GHz.

The frequency $v_2$ that the beam 86 is currently set to is subtracted from the detected reflected beam 108 at box 348, which leaves the modulation frequency $f_{mod}$. The algorithm then mixes and correlates the subtracted reflected beam 108 from the object 88 with the transmitted beam 86 at box 350. The mixing is performed in the optical domain for coherent detection or in the electronic domain for direct detection, as discussed above. The algorithm calculates the FFT of the signals representing the mixed beams to convert the signals to the frequency domain at box 352, determines the beat frequencies in the mixed and Fourier transformed signals as a function of time at box 354, identifies the intermediate frequencies $f_{IF1}$ and $f_{IF2}$ from the beat frequencies at box 356, estimates the time delay Δt between transmitted beam 86 and the reflected beam 108 from the beat frequencies to determine the distance to the object 88 at box 358 and determines the Doppler shift frequency $f_{Doppler}$ from the beat frequencies to determine the velocity of the object 88 at box 358. The algorithm then determines whether the 360° scan has been completed at decision diamond 360, and if not, returns to the box 344 for a next step frequency $v_3$-$v_n$ to change the angle ϕ of the beam 86 off of the mirror 84 until the entire 360° FOV is swept. The steps at the boxes 346-358 are repeated for each step frequency v, and once the 360° scan is complete at the decision diamond 360, the distance ranging point cloud and velocity for the object 88 is calculated and displayed at box 362.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for scanning a transmitted beam through a 360° field-of-view (FOV) and processing beams reflected off of a target in a light detection and ranging (LIDAR) system to determine a distance between the LIDAR system and the target and a velocity of the target, said LIDAR system including a transmitter sub-system and a receiver sub-system, said method comprising:

generating a laser beam to be transmitted by the transmitter sub-system at a first frequency;
determining a temperature of optical and electro-optical components in the transmitter and/or receiver sub-systems;
adjusting the first frequency of the laser beam to compensate for changes in the temperature of the optical and electro-optical components in the transmitter and/or receiver sub-systems;
directing the laser beam to a spiral phase plate resonator (SPPR) device in the transmitter sub-system having opposing reflective surfaces that reflect the laser beam back and forth in the SPPR device, wherein one of the reflective surfaces includes a spiral step index that causes multiple internal reflected beams having different phases to be combined as the transmitted beam emitted from one side of the SPPR device and having a coherent superposition of optical vortex intensity patterns and a processing beam emitted from an opposite side of the SPPR device and having a coherent superposition of optical vortex intensity patterns;
directing the transmitted beam from the SPPR device onto a conical mirror to direct the transmitted beam at a certain angle therefrom depending on the first frequency of the laser beam;
shifting the optical frequency of the laser beam to a second frequency to change the angle that the transmitted beam is directed from the conical mirror;
frequency modulating the laser beam at the second frequency over a frequency modulation range;
receiving a reflected beam from the target at the receiver sub-system;
mixing and correlating the processing beam and the reflected beam;
calculating a fast Fourier transform of signals representing the mixed processing and reflected beams;
determining beat frequencies in the mixed and transformed signals;
identifying intermediate frequencies in the beat frequencies;
estimating a time delay between the transmitted beam and the reflected beam from the beat frequencies to determine the distance to the target;
determining a Doppler shift frequency from the beat frequencies to determine the velocity of the target;
shifting the optical frequency of the laser beam to a plurality of other frequencies to change the angle that the transmitted beam is directed from the conical mirror over a complete 360° scan; and
repeating the steps of frequency modulating, receiving a reflected beam from the target, mixing and correlating, calculating a fast Fourier transform, determining beat frequencies, identifying intermediate frequencies, estimating a time delay and determining a Doppler shift frequency for each separate optical frequency.

2. The method according to claim 1 wherein mixing and correlating the processing beam and the reflected beam includes optically mixing the processing beam and the reflected beam through coherent detection.

3. The method according to claim 1 wherein mixing and correlating the processing beam and the reflected beam includes electrically mixing the processing beam and the reflected beam through coherent detection.

4. The method according to claim 1 wherein the frequency modulation range is much less than the frequency of the laser beam.

5. The method according to claim 4 wherein the frequency modulation range in the tens to hundreds of MHz and the frequency of the laser beam is in the tens to hundreds of GHz.

6. The method according to claim 1 wherein identifying intermediate frequencies in the beat frequencies includes identifying one intermediate frequency if the target is not moving and identifying two intermediate frequencies if the target is moving.

7. The method according to claim 1 wherein frequency modulating the laser beam includes using a continuous or pulsed triangular waveform.

8. The method according to claim 1 wherein shifting the optical frequency of the laser beam includes shifting the optical frequency of the laser beam in a stepwise and ramped manner.

9. The method according to claim 1 wherein determining a temperature of the optical and electro-optical components in the transmitter and/or receiver sub-systems includes reading temperature measurements from temperature sensors in the transmitter sub-system and/or the receiver sub-system or estimating a width and longitudinal modes in the SPPR device to determine its free spectral range.

10. The method according to claim 1 further comprising internally tracking the processing beam in response to changes in the frequency modulation of the transmitted beam to determine the angle that the transmitted beam is reflected from the mirror.

11. The method according to claim 10 wherein internally tracking the processing beam includes directing the processing beam onto a detector assembly in the transmitter sub-system that includes a plurality of single pixel detectors.

12. The method according to claim 11 wherein the detector assembly includes an aperture device having a plurality of apertures that are each individually fiber coupled into the single pixel detector, and wherein as the frequency of the laser beam frequency is shifted from one frequency to another frequency, one of the single pixel detectors will read a null that is indicative of the angle orientation of the transmitted beam.

13. The method according to claim 1 further comprising turning on and off the detector modules in the receiver sub-system depending on the angle that the transmitted beam is emitted from the transmitter sub-system.

14. The method according to claim 13 wherein turning on and off the detector modules includes power cycling the detector modules.

15. A method for determining a distance to and velocity of a target, said method comprising:
generating a laser beam to be transmitted;
frequency modulating the laser beam over a frequency modulation range;
directing the frequency modulated laser beam to a spiral phase plate resonator (SPPR) device;
directing a transmitted beam from the SPPR device onto a conical mirror that directs the transmitted beam at a certain angle therefrom depending on a frequency of the laser beam;
receiving a reflected beam from the target;
mixing and correlating the transmitted beam and the reflected beam;
calculating a fast Fourier transform of signals representing the mixed transmitted and reflected beams;
determining beat frequencies in the mixed and transformed signals;
identifying intermediate frequencies in the beat frequencies;

estimating a time delay between the transmitted beam and the reflected beam from the beat frequencies to determine the distance to the target; and determining a Doppler shift frequency from the beat frequencies to determine the velocity of the target.

16. The method according to claim 15 wherein mixing and correlating the transmitted beam and the reflected beam includes optically mixing the transmitted beam and the reflected beam.

17. The method according to claim 15 wherein mixing and correlating the transmitted beam and the reflected beam includes electrically mixing the transmitted beam and the reflected beam.

18. The method according to claim 15 further comprising shifting the frequency of the laser beam to a plurality of other frequencies to change the angle that the transmitted beam is directed from the conical mirror over a complete 360° scan, and repeating the steps of frequency modulating, receiving a reflected beam from the target, mixing and correlating, calculating a fast Fourier transform, determining beat frequencies, identifying intermediate frequencies, estimating a time delay and determining a Doppler shift frequency for each separate frequency.

19. The method according to claim 18 wherein the transmitted beam is scanned through a 360° field-of-view (FOV).

20. The method according to claim 15 wherein frequency modulating the laser beam includes using a continuous or pulsed triangular waveform.

21. The method according to claim 15 wherein shifting the optical frequency of the laser beam includes shifting the optical frequency of the laser beam in a stepwise and ramped manner.

22. The method according to claim 15 wherein determining a temperature of the optical and electro-optical components in the transmitter and/or receiver sub-systems includes reading temperature measurements from temperature sensors in the transmitter sub-system and/or the receiver sub-system or estimating a width and longitudinal modes in the SPPR device to determine its free spectral range.

23. The method according to claim 15 further comprising internally tracking the transmitted beam in response to changes in the frequency modulation of the transmitted beam to determine the angle that the transmitted beam is reflected from the mirror.

24. A method for determining a distance to and velocity of a target by scanning a beam through a 360° field-of-view (FOV) and processing beams reflected off of the target using a light detection and ranging (LIDAR) system, said method comprising:

generating a laser beam to be transmitted;

frequency modulating the laser beam over a frequency modulation range;

directing the frequency modulated laser beam to a spiral phase plate resonator (SPPR) device;

directing a transmitted beam from the SPPR device onto a conical mirror that directs the transmitted beam at a certain angle therefrom depending on a frequency of the laser beam;

receiving a reflected beam from the target; and processing the reflected beam.

* * * * *